US012694587B2

(12) United States Patent
Wilson et al.

(10) Patent No.: US 12,694,587 B2
(45) Date of Patent: Jul. 28, 2026

(54) ADAPTIVE TELECONFERENCING EXPERIENCES USING GENERATIVE IMAGE MODELS

(71) Applicant: Microsoft Technology Licensing, LLC, Redmond, WA (US)

(72) Inventors: Andrew D. Wilson, Seattle, WA (US); Shwetha Rajaram, Ann Arbor, MI (US); Nels Numan, Redmond, WA (US); Balasaravanan Thoravi Kumaravel, Bellevue, WA (US); Nicolai Marquardt, Sammamish, WA (US); Henrik Turbell, Redmond, WA (US); Amit Gulati, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 18/542,501

(22) Filed: Dec. 15, 2023

(65) Prior Publication Data

US 2025/0200843 A1     Jun. 19, 2025

(51) Int. Cl.
| | |
|---|---|
| *G06T 11/40* | (2006.01) |
| *G06T 7/10* | (2017.01) |
| *G06T 7/60* | (2017.01) |

(52) U.S. Cl.
CPC ............... *G06T 11/40* (2013.01); *G06T 7/10* (2017.01); *G06T 7/60* (2013.01); *G06T 2207/10016* (2013.01); *G06T 2207/20081* (2013.01); *G06T 2207/20084* (2013.01); *G06T 2207/20092* (2013.01); *G06T 2207/20212* (2013.01); *G06T 2207/30196* (2013.01)

(58) Field of Classification Search
CPC .............. G06T 11/40; G06T 7/10; G06T 7/60
See application file for complete search history.

(56) References Cited

U.S. PATENT DOCUMENTS

| | | | | |
|---|---|---|---|---|
| 10,045,000 | B1 | 8/2018 | Chen | |
| 11,716,446 | B2 * | 8/2023 | Adcock | .................. H04N 7/157 |
| | | | | 348/14.03 |
| 11,785,179 | B1 * | 10/2023 | Graybill | ............... G06V 10/751 |
| | | | | 348/14.08 |

(Continued)

FOREIGN PATENT DOCUMENTS

CN     118097076 A     5/2024

OTHER PUBLICATIONS

Invitation to Pay Additional Fees received for PCT Application No. PCT/US2024/055589, Feb. 27, 2025, 12 pages.

(Continued)

*Primary Examiner* — Olisa Anwah
(74) *Attorney, Agent, or Firm* — Rainier Patents, P.S.

(57) ABSTRACT

This document relates to providing adaptive teleconferencing experiences using generative image models. For example, the disclosed implementations can employ inpainting and/or image-to-image restyling modes of a generative image model to generate images for a teleconference. The images can be generated based on prompts relating to the teleconference. Users can be superimposed on the generated images, thus giving the appearance that the users are present in an environment generated by the generative image model.

20 Claims, 16 Drawing Sheets

METHOD
800

802 — RECEIVE FIRST VIDEO SIGNAL

804 — RECEIVE SECOND VIDEO SIGNAL

806 — INPUT BACKGROUNDS TO GENERATIVE IMAGE MODEL

808 — RECEIVE INPAINTED IMAGE

810 — COMPOSITE USERS

812 — OUTPUT COMPOSITED INPAINTED IMAGE

(56) References Cited

U.S. PATENT DOCUMENTS

| 12,368,820 | B2* | 7/2025 | Dave | G10L 19/26 |
| 2004/0125207 | A1 | 7/2004 | Mittal | |
| 2010/0302446 | A1* | 12/2010 | Mauchly | H04N 21/4788 348/14.08 |
| 2016/0198097 | A1* | 7/2016 | Yewdall | H04N 5/272 348/659 |
| 2017/0264945 | A1 | 9/2017 | Depies | |
| 2023/0117301 | A1 | 4/2023 | Olivieri | |
| 2023/0164298 | A1 | 5/2023 | Khot | |
| 2023/0274478 | A1 | 8/2023 | Turgutlu | |
| 2023/0298280 | A1 | 9/2023 | Jouet | |
| 2024/0046597 | A1 | 2/2024 | Buibas | |
| 2024/0153124 | A1 | 5/2024 | Kim | |
| 2024/0212184 | A1 | 6/2024 | Du | |
| 2024/0236259 | A1* | 7/2024 | Gandhi | H04N 7/15 |
| 2024/0420437 | A1 | 12/2024 | Gausebeck | |
| 2025/0069190 | A1* | 2/2025 | Lindmark | G06T 7/11 |
| 2025/0086812 | A1 | 3/2025 | Engin | |
| 2025/0095224 | A1* | 3/2025 | Malpani | G06T 11/00 |
| 2025/0200827 | A1 | 6/2025 | Joshi | |
| 2025/0371732 | A1 | 12/2025 | Lin | |
| 2026/0004522 | A1 | 1/2026 | Wilson | |
| 2026/0105581 | A1 | 4/2026 | Kumaravel | |

OTHER PUBLICATIONS

Zhang, et al., "ControlNet for Stable Diffusion WebUI", Retrieved from: https://github.com/Mikubill/sd-webui-controlnet, Oct. 15, 2023, 10 Pages.

Zhang, et al., "Adding Conditional Control to Text-to-Image Diffusion Models", In repository of arXiv:2302.05543v2, Sep. 2, 2023, 12 Pages.

Bae, et al., "Irondepth: Iterative refinement of single-view depth using surface normal and its uncertainty," arXiv preprint arXiv:2210.03676, Oct. 2022, 14 pages.

Bar-Tal, et al., "Multidiffusion: Fusing diffusion paths for controlled image generation," 2023, In Proceedings of the 40th International Conference on Machine Learning, ICML'23, vol. 202, JMLR.org, Honolulu, Hawaii, USA, pp. 1737-1752, 16 pages.

Feng, et al., "Layoutgpt: Compositional visual planning and generation with large language models," 2024, Advances in Neural Information Processing Systems, 36, 26 Pages.

Gloeckle, et al., "Better & Faster Large Language Models via Multi-token Prediction," Apr. 30, 2024, arXiv preprint arXiv:2404.19737, 29 pages.

He, et al., "Deep Residual Learning for Image Recognition," in Proceedings of the IEEE Conference on Computer Vision and Pattern Recognition, 2016, pp. 770-778.

Höllein, et al., "Text2room: Extracting textured 3d meshes from 2d text-to-image models," In Proceedings of the IEEE/CVF International Conference on Computer Vision, 2023, pp. 7909-7920, 18 pages.

Jain, et al., "Oneformer: One transformer to rule universal image segmentation," In Proceedings of the IEEE/CVF Conference on Computer Vision and Pattern Recognition, 2023, pp. 2989-2998, 10 pages.

Li, et al., "Blip: Bootstrapping language-image pre-training for unified vision-language understanding and generation," International conference on machine learning, Jun. 2022, pp. 12888-12900, PMLR, 12 pages.

Li, et al., "Blip-2: Bootstrapping language-image pre-training with frozen image encoders and large language models," International conference on machine learning, Jul. 2023, pp. 19730-19742, PMLR, 13 pages.

Ren, et al., "Faster R-CNN: Towards Real-Time Object Detection with Region Proposal Networks", IEEE Transactions on Pattern Analysis and Machine Intelligence, vol. 39, No. 6, Jun. 5, 2016, pp. 1137-1149.

Ren, et al., "Grounded SAM: Assembling open-world models for diverse visual tasks," Jan. 25, 2024, arXiv preprint arXiv:2401.14159, 11Pages.

Song, et al., "Sun rgb-d: A rgb-d scene understanding benchmark suite," In Proceedings of the IEEE conference on computer vision and pattern recognition, 2015, pp. 567-576, 10 pages.

Team C, "Chameleon: Mixed-modal early-fusion foundation models," arXiv preprint, arXiv:2405.09818, May 16, 2024, 27 Pages.

Wang, et al., "Knowledge guided disambiguation for large-scale scene classification with multi-resolution CNNs," 2017, IEEE Transactions on Image Processing, 26(4), 2055-2068, 14 pages.

Yin, et al., "Metric3d: Towards zero-shot metric 3d prediction from a single image," 2023, In Proceedings of the IEEE/CVF International Conference on Computer Vision, pp. 9043-9053.

Yu, et al., "LSUN: Construction of a large-scale image dataset using deep learning with humans in the loop," 2015, arXiv preprint arXiv:1506.03365, 9 pages.

Zhou, et al., "Scene parsing through ade20k dataset," In Proceedings of the IEEE conference on computer vision and pattern recognition, 2017, pp. 633-641.

"Broadcasting audio and video from Microsoft Teams with NDI and SDI technology", Retrieved from: http://support.microsoft.com/en-gb/office/broadcasting-audio-and-video-from-microsoft-teams-with-ndi-and-sdi-technology-e91a0adb-96b9-4dca-a2cd-07181276afa3, Retrieved Date: Sep. 29, 2023, 4 Pages.

"GPT-4 Technical Report", In Repository of arXiv:2303.08774v1, Mar. 15, 2023, 99 Pages.

"Together Mode", Retrieved from: https://www.microsoft.com/en-us/microsoft-teams/teams-together-mode, Retrieved Date: Sep. 29, 2023, 3 Pages.

Ball, David, "Introducing Immersive View, A Fun New Way to Meet", Retrieved From: https://blog.zoom.us/introducing-zoom-immersive-view/, Apr. 26, 2021, 3 Pages.

Benabdallah, et al., "Remote Learners, Home Makers: How Digital Fabrication Was Taught Online During a Pandemic", In Proceedings of the 2021 CHI Conference on Human Factors in Computing Systems, May 8, 2021, 14 Pages.

Brade, et al., "Promptify: Text-to-Image Generation through Interactive Prompt Exploration with Large Language Models", In repository of arXiv:2304.09337v1, Apr. 18, 2023, 14 Pages.

Braun, et al., "Using Thematic Analysis in Psychology", In Journal of Qualitative Research in Psychology, vol. 3, Issue 2, Jan. 1, 2006, pp. 77-101.

Brown, et al., "Language Models are Few-Shot Learners", In Proceedings of 34th Conference on Neural Information Processing Systems, Dec. 6, 2020, pp. 1-25.

Buxton, Bill, "Mediaspace—Meaningspace—Meetingspace", In journal of Computer Supported Cooperative Work, 2009, pp. 217-231.

Cai, et al., "Breakdowns and Breakthroughs: Observing Musicians' Responses to the COVID-19 Pandemic", In Proceedings of the 2021 CHI Conference on Human Factors in Computing Systems, May 8, 2021, 13 Pages.

Choi, et al., "Aesthetic Flattening", Retrieved from: https://dl.acm.org/doi/pdf/10.1145/3468080, Jul. 2021, pp. 21-23.

Coyne, et al., "WordsEye: An Automatic Text-to-Scene Conversion System", In Proceedings of 28th Annual Conference on Computer Graphics and Interactive Techniques, Aug. 1, 2001, pp. 487-496.

Dang, et al., "World—Smith: Iterative and Expressive Prompting for World Building with a Generative AI", In repository of arXiv:2308.13355v1, Aug. 25, 2023, 17 Pages.

Dell, et al., "Yours is Better!: Participant Response Bias in HCI", In Proceedings of the SIGCHI Conference on Human Factors in Computing Systems, May 5, 2012, pp. 1321-1330.

El-Nouby, et al., "Tell, Draw, and Repeat: Generating and Modifying Images Based on Continual Linguistic Instruction", In Proceedings of the IEEE/CVF International Conference on Computer Vision, 2019, pp. 10304-10312.

Fauville, et al., "Zoom Exhaustion & Fatigue Scale", In Journal of Computers in Human Behavior Reports, vol. 4, Aug. 1, 2021, 10 Pages.

Follmer, et al., "Video Play: Playful Interactions in Video Conferencing for Long-Distance Families with Young Children", In Proceed-

(56) References Cited

OTHER PUBLICATIONS ings of the 9th International Conference on Interaction Design and Children, Jun. 9, 2010, pp. 49-58.

Fuchsberger, et al., "Grandparents and Grandchildren Meeting Online: The Role of Material Things in Remote Setings", In Proceedings of CHI Conference on Human Factors in Computing Systems, May 8, 2021, 14 Pages.

Gronbaek, et al., "Mirrorverse: Live Tailoring of Video Conferencing Interfaces", In Proceedings of 36th Annual ACM Symposium on User Interface Software and Technology, Oct. 29, 2023, 14 Pages.

Gronbaek, et al., "MirrorBlender: Supporting Hybrid Meetings with a Malleable Video-Conferencing System", In Proceedings of CHI Conference on Human Factors in Computing Systems, May 7, 2021, 13 Pages.

Gronbaek, et al., "Partially Blended Realities: Aligning Dissimilar Spaces for Distributed Mixed Reality Meetings", In Proceedings of CHI Conference on Human Factors in Computing Systems, Apr. 23, 2023, 16 Pages.

Hacker, et al., "Virtually in this together—how web-conferencing systems enabled a new virtual togetherness during the COVID-19 crisis", In European Journal of Information Systems, vol. 29, Issue 5, Sep. 2, 2020, pp. 563-584.

Herskovitz, et al., "XSpace: An Augmented Reality Toolkit for Enabling Spatially-Aware Distributed Collaboration", In Proceedings of the ACM on Human-Computer Interaction, vol. 6, Dec. 2022, pp. 1-26.

Hu, et al., "OpenMic: Utilizing Proxemic Metaphors for Conversational Floor Transitions in Multiparty Video Meetings", In Proceedings of CHI Conference on Human Factors in Computing Systems, Apr. 23, 2023, 17 Pages.

Hu, et al., "ThingShare: Ad-Hoc Digital Copies of Physical Objects for Sharing Things in Video Meetings", In Proceedings of CHI Conference on Human Factors in Computing Systems, Apr. 23, 2023, 22 Pages.

Hunter, et al., "WaaZam! Supporting Creative Play at a Distance in Customized Video Environments", In the Conference on Human Factors in Computing Systems, Apr. 26, 2014, pp. 1197-1206.

Hyrkas, et al., "Spatialized Audio and Hybrid Video Conferencing: Where Should Voices be Positioned for People in the Room and Remote Headset Users?", In Proceedings of CHI Conference on Human Factors in Computing Systems, Apr. 23, 2023, 14 Pages.

Jun, et al., "Shap E: Generating Conditional 3D Implicit Functions", In repository of arXiv:2305.02463v1, May 3, 2023, pp. 1-23.

Junuzovic, et al., "IllumiShare: Sharing Any Surface", In Proceedings of the SIGCHI Conference on Human Factors in Computing Systems, May 5, 2012, pp. 1919-1928.

Karnewar, et al., "HoloDiffusion: Training a 3D Diffusion Model Using 2D Images.", In Proceedings of the IEEE/CVF Conference on Computer Vision and Pattern Recognition, 2023, pp. 18423-18433.

Kumaravel, et al., "Loki: Facilitating Remote Instruction of Physical Tasks Using Bi-Directional Mixed-Reality Telepresence", In Proceedings of 32nd Annual ACM Symposium on User Interface Software and Technology, Oct. 20, 2019, pp. 161-174.

Lee, et al., "Distracting Moments in Videoconferencing: A Look Back at the Pandemic Period", In Proceedings of CHI Conference on Human Factors in Computing Systems, Apr. 27, 2022, 21 Pages.

Li, et al., "GLIGEN: Open-Set Grounded Text-to-Image Generation", In Proceedings of the IEEE/CVF Conference on Computer Vision and Pattern Recognition, 2023, pp. 22511-22521.

Morikawa, et al., "HyperMirror: Toward Pleasant-to-use Video Mediated Communication System", In Proceedings of the ACM Conference on Computer Supported Cooperative Work, Nov. 14, 1998, pp. 149-158.

Numan, et al., "Ubiq-Genie: Leveraging External Frameworks for Enhanced Social VR Experiences", In Proceedings of IEEE Conference on Virtual Reality and 3D User Interfaces Abstracts and Workshops (VRW), Mar. 25, 2023, pp. 497-501.

O'Hara, et al., "Blended Interaction Spaces for Distributed Team Collaboration", In Proceedings of ACM Transactions on Computer-Human Interaction, vol. 18, Issue: 1, Apr. 2011, pp. 1-28.

Palakis, "NewTek NDI™ integration into OBS Studio", Retrieved from: https://obsproject.com/forum/resources/obs-ndi-newtek-ndi%E2%84%A2-integration-into-obs-studio.528/, Jun. 1, 2017, 4 Pages.

Pejsa, et al., "Room2Room: Enabling Life-Size Telepresence in a Projected Augmented Reality Environment", In Proceedings of 19th ACM Conference on Computer-Supported Cooperative Work & Social Computing, Feb. 27, 2016, pp. 1716-1725.

Rombach, et al., "High-resolution image synthesis with latent diffusion models", In Proceedings of IEEE/CVF Conference on Computer Vision and Pattern Recognition, Jun. 18, 2022, pp. 10684-10695.

Scupin, Raymond, "Th KJ Method: A Technique for Analyzing Data Derived from Japanese Ethnology", In Journal of Human Organization, vol. 56, Issue 2, 1997, pp. 233-237.

Sharma, et al., "ChatPainter: Improving Text to Image Generation using Dialogue", In Repository of arXiv:1802.08216v1, Feb. 22, 2018, 9 Pages.

Sra, et al., "Oasis: Procedurally Generated Social Virtual Spaces from 3D Scanned Real Spaces", In Journal of IEEE Transactions on Visualization and Computer Graphics, vol. 24, Issue 12, Dec. 2018, Dec. 1, 2018, pp. 3174-3187.

Tang, et al., "Perspectives: Creating Inclusive and Equitable Hybrid Meeting Experiences.", In Proceedings of the ACM on Human-Computer Interaction, vol. 7, Oct. 4, 2023, pp. 1-25.

Venolia, et al., "Wish You Were Here: Being Together Through Composite Video and Digital Keepsakes", In Proceedings of 20th International Conference on Human-Computer Interaction with Mobile Devices and Services, Sep. 3, 2018, pp. 1-11.

Wiseman, Ben, "Research Proves Your Brain Needs Breaks", Retrieved from: https://www.microsoft.com/en-us/worklab/work-trend-index/brain-research, Apr. 20, 2021, 17 Pages.

Yang, et al., "DreamWalker: Substituting Real-World Walking Experiences with a Virtual Reality", In Proceedings of 32nd Annual ACM Symposium on User Interface Software and Technology, Oct. 20, 2019, pp. 1093-1107.

Young Chung, et al., "Artinter: AI-powered Boundary Objects for Commissioning Visual Arts", In Proceedings of ACM Designing Interactive Systems, Jul. 10, 2023, 22 Pages.

Young Chung, et al., "PromptPaint: Steering Text-to-Image Generation Through Paint Medium-like Interactions", In repository of arXiv:2308.05184v1, Aug. 9, 2023, 17 Pages.

Young Chung, et al., "TaleBrush: Sketching Stories with Generative Pretrained Language Models", In Proceedings of CHI Conference on Human Factors in Computing System, Apr. 29, 2022, 19 Pages.

Yuan, et al., "Tabletop Games in the Age of Remote Collaboration: Design Opportunities for a Socially Connected Game Experience", In Proceedings of CHI Conference on Human Factors in Computing Systems, May 8, 2021, 14 Pages.

International Search Report and Written Opinion received for PCT Application No. PCT/US2024/055589, Apr. 17, 2025, 21 pages.

Radford, et al., "Improving Language Understanding by Generative Pre-Training," available at https://cdn.openai.com/research-covers/language-unsupervised/language_understanding_paper.pdf, Jun. 11, 2018, 12 pages.

International Search Report and Written Opinion received for PCT Application No. PCT/US2025/019660, mailed on Aug. 8, 2025, 14 pages.

Song, et al., "RoomDreamer: Text-Driven 3D Indoor Scene Synthesis with Coherent Geometry and Texture", Proceedings of the 18th European Workshop on Systems Security, Oct. 26, 2023, pp. 6898-6906.

International Search Report and Written Opinion received for PCT Application No. PCT/US2025/038991, mailed on Oct. 17, 2025, 20 Pages.

Li, et al., "Contextual Outpainting with Object-Level Contrastive Learning", IEEE/CVF Conference on Computer Vision and Pattern Recognition (CVPR), Jun. 18, 2022, pp. 11441-11450.

Olafenwa, Ayoola. "Simplifying object segmentation with pixellib library", Online.(2021), https://vixra. org/abs/2101.0122 (2021).

(56)　　　　　References Cited

OTHER PUBLICATIONS

Tuddenham, et al., "Territorial coordination and workspace awareness in remote tabletop collaboration." In Proceedings of the SIGCHI Conference on Human Factors in Computing Systems, pp. 2139-2148. 2009.

Xia, et al., "Spacetime: Enabling fluid individual and collaborative editing in virtual reality." In Proceedings of the 31st annual ACM symposium on user interface software and technology, pp. 853-866. 2018.

Yu, et al., "Free-form image inpainting with gated convolution." In Proceedings of the IEEE/CVF international conference on computer vision, pp. 4471-4480. 2019.

Zagermann, et al., "When tablets meet tabletops: The effect of tabletop size on around-the-table collaboration with personal tablets." In Proceedings of the 2016 CHI Conference on Human Factors in Computing Systems, pp. 5470-5481. 2016.

Zhang, et al., "Real-time user-guided image colorization with learned deep priors." arXiv preprint arXiv:1705.02999 (2017).

Agarwala, et al., "Interactive digital photomontage." In ACM SIGGRAPH 2004 Papers, pp. 294-302. 2004.

Avidan, et al., "Seam carving for content-aware image resizing." In Seminal Graphics Papers: Pushing the Boundaries, vol. 2, pp. 609-617. 2023.

Chen, et al., "Meetscript: designing transcript-based interactions to support active participation in group video meetings." Proceedings of the ACM on Human-Computer Interaction 7, No. CSCW2 (2023): 1-32.

Dang, et al., "Ganslider: How users control generative models for images using multiple sliders with and without feedforward information." In Proceedings of the 2022 CHI Conference on Human Factors in Computing Systems, pp. 1-15. 2022.

Olsen Jr, Dan R. "Evaluating user interface systems research." In Proceedings of the 20th annual ACM symposium on User interface software and technology, pp. 251-258. 2007.

Koh, et al., "Simple and effective synthesis of indoor 3d scenes." In Proceedings of the AAAI conference on artificial intelligence, vol. 37, No. 1, pp. 1169-1178. 2023.

Labrie, et al., "Toward video-conferencing tools for hands-on activities in online teaching." Proceedings of the ACM on human-computer interaction 6, No. Group (2022): 1-22.

Li, et al., "Panogen: Text-conditioned panoramic environment generation for vision-and-language navigation." Advances in neural information processing systems 36 (2023): 21878-21894.

Liu, et al., "Opal: Multimodal image generation for news illustration." In Proceedings of the 35th Annual ACM Symposium on User Interface Software and Technology, pp. 1-17. 2022.

Mirza, et al., "Conditional generative adversarial nets." arXiv preprint arXiv:1411.1784 (2014).

Mu, et al., "Whispering through walls: towards inclusive backchannel communication in hybrid meetings." In Proceedings of the 2024 CHI Conference on Human Factors in Computing Systems, pp. 1-16. 2024.

Numan, et al., "Spaceblender: Creating context-rich collaborative spaces through generative 3d scene blending." In Proceedings of the 37th Annual ACM Symposium on User Interface Software and Technology, pp. 1-25. 2024.

Rajaram, et al., "BlendScape: Enabling End-User Customization of Video-Conferencing Environments through Generative AI." In Proceedings of the 37th Annual ACM Symposium on User Interface Software and Technology, pp. 1-19. 2024.

Han, et al., "Dr.'s Eye: The Design and Evaluation of a Video Conferencing System to Support Doctor Appointments in Home Settings." In Proceedings of the 2023 CHI Conference on Human Factors in Computing Systems, pp. 1-18. 2023 (Abstract only).

Zhang, et al., "Vrgit: A version control system for collaborative content creation in virtual reality." In Proceedings of the 2023 CHI Conference on Human Factors in Computing Systems, pp. 1-14. 2023 (Abstract only).

Non-Final Office Action mailed on May 6, 2026, in U.S. Appl. No. 18/915,915, 23 Pages.

Non-Final office Action mailed on Mar. 11, 2026, in U.S. Appl. No. 18/756,717, 11 Pages.

* cited by examiner

BACKGROUND ESTIMATION 230

BACKGROUND ESTIMATION 230

604

606

608

602

METHOD
800

802 — RECEIVE FIRST VIDEO SIGNAL

804 — RECEIVE SECOND VIDEO SIGNAL

806 — INPUT BACKGROUNDS TO GENERATIVE IMAGE MODEL

808 — RECEIVE INPAINTED IMAGE

810 — COMPOSITE USERS

812 — OUTPUT COMPOSITED INPAINTED IMAGE

METHOD
900

ADAPTIVE TELECONFERENCING EXPERIENCES USING GENERATIVE IMAGE MODELS

BACKGROUND

One important use case for computing devices involves teleconferencing, where participants communicate with remote participants via audio and/or video over a network. In some cases, call participants are displayed in separate regions of a user interface. In other cases, rudimentary approaches have been employed to present participants in a common space, such as a conference room. However, these approaches tend to place the participants in generic, unfamiliar spaces, resulting in unnatural experiences.

SUMMARY

This Summary is provided to introduce a selection of concepts in a simplified form. These concepts are further described below in the Detailed Description. This Summary is not intended to identify key features or essential features of the claimed subject matter, nor is it intended to be used to limit the scope of the claimed subject matter.

The description generally relates to techniques for enhanced teleconferencing. One example includes a computer-implemented method that can include receiving a first video signal captured by a first camera of a first computing device during a teleconference, the first video signal including a first user and a first background of the first user. The method can also include receiving a second video signal captured by a second camera of a second computing device during the teleconference, the second video signal including a second user and a second background of the second user. The method can also include inputting at least the first background and the second background to a generative image model and instructing the generative image model to inpaint around the first background and the second background. The method can also include receiving an inpainted image from the generative image model. The method can also include compositing the first user and the second user on the inpainted image to obtain a composited inpainted image. The method can also include outputting the composited inpainted image.

Another examples includes a computer-implemented method that can include receiving a first video signal captured by a first camera of a first computing device during a teleconference, the first video signal including a first user. The method can also include receiving a second video signal captured by a second camera of a second computing device during the teleconference, the second video signal including a second user. The method can also include receiving a selected image. The method can also include inputting at least the selected image to a generative image model and instructing the generative image model to generate a restyled image from the selected image. The method can also include receiving the restyled image from the generative image model. The method can also include compositing the first user and the second user on the restyled image to obtain a composited restyled image. The method can also include outputting the composited restyled image.

Another example entails a system that includes a processor and a storage medium storing instructions. When executed by the processor, the storage medium storing instructions can cause the system to receive a first video signal captured by a first camera of a first computing device during a teleconference, the first video signal including a first user and a first background of the first user. The storage medium storing instructions can also cause the system to receive a second video signal captured by a second camera of a second computing device during the teleconference, the second video signal including a second user and a second background of the second user. The storage medium storing instructions can also cause the system input the first background and the second background to a generative image model and instruct the generative image model to inpaint around the first background and the second background. The storage medium storing instructions can also cause the system to receive an inpainted image from the generative image model. The storage medium storing instructions can also cause the system to composite the first user and the second user on the inpainted image to obtain a composited inpainted image. The storage medium storing instructions can also cause the system to send the composited inpainted image to at least one of the first computing device, the second computing device, or another computing device of another user.

The above-listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
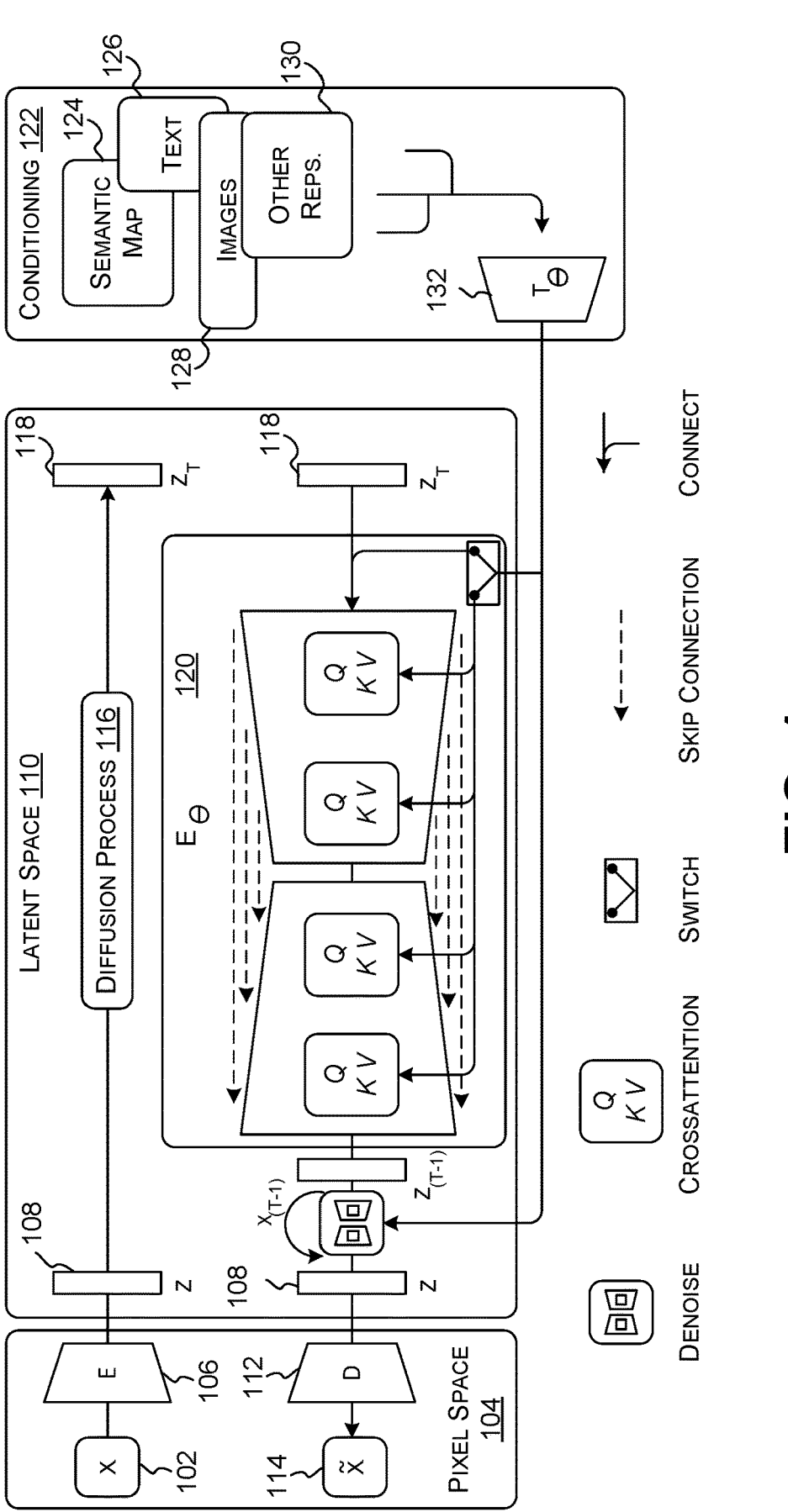
FIG. 1 illustrates an example generative image model, consistent with some implementations of the present concepts.

The disclosed implementations generally offer techniques for enabling high-quality user experiences for teleconferences. One example of a conventional approach for video teleconferencing involves placing participants in separate regions of a video grid within generic rooms. These generic rooms are generally not familiar to the participants, and are not tailored to the context of a given meeting. These generic spaces can lead to meeting fatigue, reduce user engagement, and also hinder conversational flow among participants.

The disclosed implementations can employ generative image models to create more natural and familiar environments for teleconferences. More specifically, the disclosed techniques can employ various types of context to condition generative image models to generate background images for teleconferences. For instance, some implementations can use the backgrounds of two or more users as a type of context for conditioning a generative image model to generate a blended background for a given teleconference, potentially using a natural language prompt as additional context. As another example, some implementations can employ user-selected images as a type of context for conditioning a generative image model to generate a background for a given teleconference, again potentially using a natural language prompt as additional context.

Machine Learning Overview

There are various types of machine learning frameworks that can be trained to perform a given task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "parameters" when used without a modifier is used herein to refer to learnable values such as edge weights and bias values that can be learned by training a machine learning model, such as a neural network.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with parameters for the model structure that have been trained or tuned. Note that two trained models can share the same model structure and yet have different values for the parameters, e.g., if the two models are trained on different training data or if there are underlying stochastic processes in the training process.

There are many machine learning tasks for which there is a relative lack of training data. One broad approach to training a model with limited task-specific training data for a particular task involves "transfer learning." In transfer learning, a model is first pretrained on another task for which significant training data is available, and then the model is tuned to the particular task using the task-specific training data.

The term "pretraining," as used herein, refers to model training on a set of pretraining data to adjust model parameters in a manner that allows for subsequent tuning of those model parameters to adapt the model for one or more specific tasks. In some cases, the pretraining can involve a self-supervised learning process on unlabeled pretraining data, where a "self-supervised" learning process involves learning from the structure of pretraining examples, potentially in the absence of explicit (e.g., manually-provided) labels. Subsequent modification of model parameters obtained by pretraining is referred to herein as "tuning." Tuning can be performed for one or more tasks using supervised learning from explicitly-labeled training data, in some cases using a different task for tuning than for pretraining.

Terminology

For the purposes of this document, the term "signal" refers to a function that varies over time or space. A signal can be represented digitally using data samples, such as audio samples, video samples, or one or more pixels of an image. The term "mixing," as used herein, refers to combining two or more signals to produce another signal. Mixing can include adding two audio signals together, interleaving individual audio signals in different time slices, adding video signals and audio signals together to create a playback signal, etc. The term "synchronizing" means aligning two or more signals, e.g., prior to mixing. For instance, two or more microphone signals can be synchronized by identifying corresponding frames in the respective signals and temporally aligning those frames. Likewise, loudspeakers can also be synchronized by identifying and temporally aligning corresponding frames in sounds played back by the loudspeakers. In addition, audio signals can be synchronized to video signals. The term "playback signal," as used herein, refers to a signal that can be played back by a loudspeaker, a display, etc. A playback signal can be a combination of one or more microphone signals and one or more video signals.

The following discussion also mentions audio/visual devices such as microphones, loudspeakers, and video devices (e.g., web cameras). Note that an A/V device for a computing device can be an integrated component of that computing device (e.g., included in a device housing) or can be an external peripheral in wired or wireless communication with that computing device.

For the purposes of this document, the term "language model" refers to any type of automated agent that communicates via natural language or is programmed to understand natural language. For instance, a language model can be implemented as a neural network, e.g., a decoder-based generative language model, a long short-term memory model, etc. Examples of generative language models include versions of models such as ChatGPT, BLOOM, PaLM, and/or LLAMA. The term "image model" refers to any type of automated agent that processes images or video. For instance, an image model can be implemented as a neural network, e.g., a generative image model such as Stable Diffusion or DALLE.

The term "generative model," as used herein, refers to a machine learning model employed to generate new content.

Generative models can be trained to predict items in sequences of training data. When employed in inference mode, the output of a generative model can include new sequences of items that the model generates. Thus, a "generative language model" is a model that can generate new sequences of text given some input prompt, e.g., a query potentially with some additional context. A "generative image model" is a model that can generate new images or portions of images given inputs such as a prompt or one or more other images.

The term "prompt," as used herein, refers to input provided to a generative model that the generative model uses to generate outputs. A prompt can include a query, e.g., a request for information from the generative language model. A prompt can also include context, or additional information that the generative language model uses to respond to the query. The term "in-context learning," as used herein, refers to learning, by a generative model, from examples input to the model at inference time, where the examples enable the generative model to learn without performing explicit training, e.g., without updating model parameters using supervised, unsupervised, or semi-supervised learning.

The term "machine learning model" refers to any of a broad range of models that can learn to generate automated user input and/or application output by observing properties of past interactions between users and applications. For instance, a machine learning model could be a neural network, a support vector machine, a decision tree, a clustering algorithm, etc. In some cases, a machine learning model can be trained using labeled training data, a reward function, or other mechanisms, and in other cases, a machine learning model can learn by analyzing data without explicit labels or rewards.

Example Generative Image Model

FIG. 1 illustrates an example generative image model 100. An image 102 (X) in pixel space 104 (e.g., red, green, blue) is encoded by an encoder 106 (E) into a representation 108 (Z) in a latent space 110. A decoder 112 (D) is trained to decode the latent representation Z to produce a reconstructed image 114 (X~) in the pixel space. For instance, the encoder can be trained (with the decoder) as a variational autoencoder using a reconstruction loss term with a regularization term.

In the latent space 110, a diffusion process 116 adds noise to obtain a noisy representation 118 ($Z_T$). A denoising component 120 ($E_\theta$) is trained to predict the noise in the compressed latent image $Z_T$. The denoising component can include a series of denoising autoencoders implemented using UNet 2D convolutional layers.

The denoising can involve conditioning 122 on other modalities, such as a semantic map 124, text 126, images 128, or other representations 130 which can be processed to obtain an encoded representation 132 ($T_\theta$). For instance, text can be encoded using a text encoder (e.g., BERT, CLIP, etc.) to obtain the encoded representation. This encoded representation can be mapped to layers of the denoising component using cross-attention. The result is a text-conditioned latent diffusion model that can be employed to generate images conditioned on text inputs. To train a model such as CLIP, pairs of images and captions can be obtained from a dataset to encode both the images and captions, and the encoder can be trained to represent pairs of images and captions with similar embeddings.

Generative image model 100 can be employed for text to image generation, where an image is generated from a text prompt. In other cases, generative image model 100 can be employed for image-to-image mode, where an image is generated using an input image as well as a text prompt. Generative image model 100 can also be employed for inpainting, where parts of an image are masked and remain fixed while the rest of the image is generated by the model, in some cases conditioned on a text prompt.

In some cases, generative image model 100 can be implemented as a Stable Diffusion model (Rombach, et al., "*High-Resolution Image Synthesis with Latent Diffusion Models,*" Proceedings of the IEEE/CVF Conference on Computer Vision and Pattern Recognition, 2022), which can be guided by a separate network, such as a ControlNet (Zhang, et al., "*Adding Conditional Control to Text-to-Image Diffusion Models,*" Proceedings of the IEEE/CVF International Conference on Computer Vision, 2023). For instance, a ControlNet can guide the generative model to produce an image that preserves certain aspects of another image, e.g., the spatial layout and salient features of an image prior. A ControlNet can be implemented by locking the parameters of generative image model 100, cloning the model into another copy. The copy is connected to the original model with one or more zero convolutional layers which are then optimized with the parameters of the copy. For instance, the ControlNet can be trained to preserve edges, lines, boundaries, human poses, from an image, semantic segmentations, object depth, etc. The outputs of a ControlNet can be added to connections within the denoising layer. Thus, the generative image model can produce images that are conditioned not only on text, but also aspects of another image.

Generative Modes

Generative image model 100 can implement a number of different modes. In a text-to-image mode, an image is generated from a given text prompt. In an image-to-image mode, an image is generated from a text prompt and an input image, and the generated image retains features of the input image while introducing new elements or styles consistent with the prompt. In an inpainting mode, the processing is similar to the image-to-image mode, but an image mask is used to determine which parts of the image are fixed to match the input image. The rest of the image is generated in a way that it is consistent with the fixed parts of the image. Note that the term "inpainting," as used herein, includes filling in parts of a given image as well as extending an image outward.

The disclosed implementations employ the inpainting mode to create a new environment by merging users' video feed backgrounds into a unified environment, and employ the image-to-image mode to transform an existing image of an environment (i.e., an image prior) based on one or more prompts (e.g., relating to purpose of the teleconference) and composites users' videos within the transformed images. Participants can also steer the generation of generated environments through multimodal interaction techniques, including text-based prompts, direct manipulation, and choice of image priors.

Inpainting Example

FIGS. 2A-2D show an example of how inpainting can be employed in teleconferencing scenarios. A control interface 200 is shown below an image 210 from a video signal received from a computing device of a first user, and an image 220 from a video signal received from a computing device of a second user. One of the users configures the control interface using a "generate from webcam" composition mode with a "brainstorming" activity and a "library" theme.

Figure 2A:
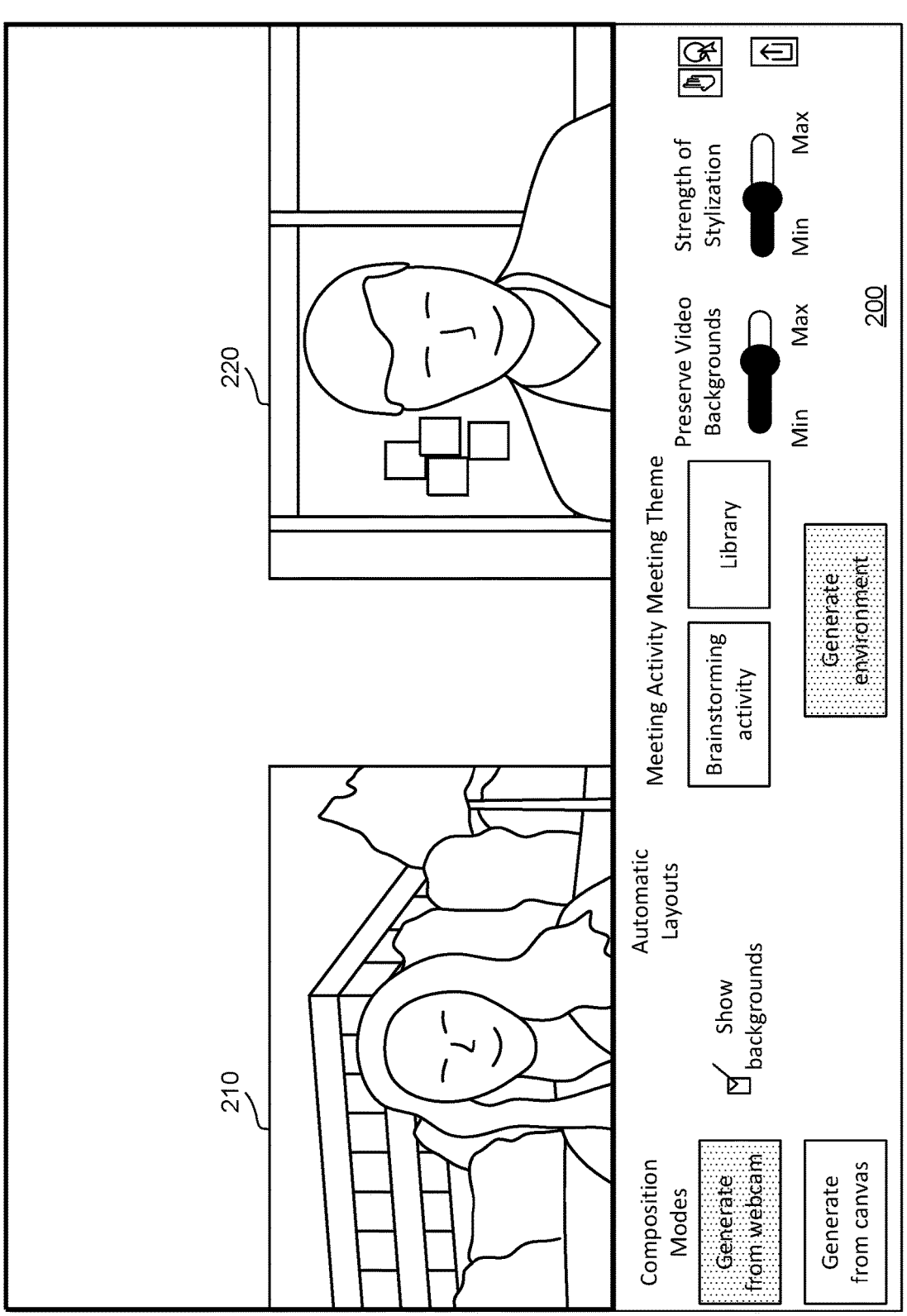
FIG. 2A-2D illustrate an example teleconferencing scenario involving inpainting, consistent with some implementations of the present concepts.
Figure 2B:
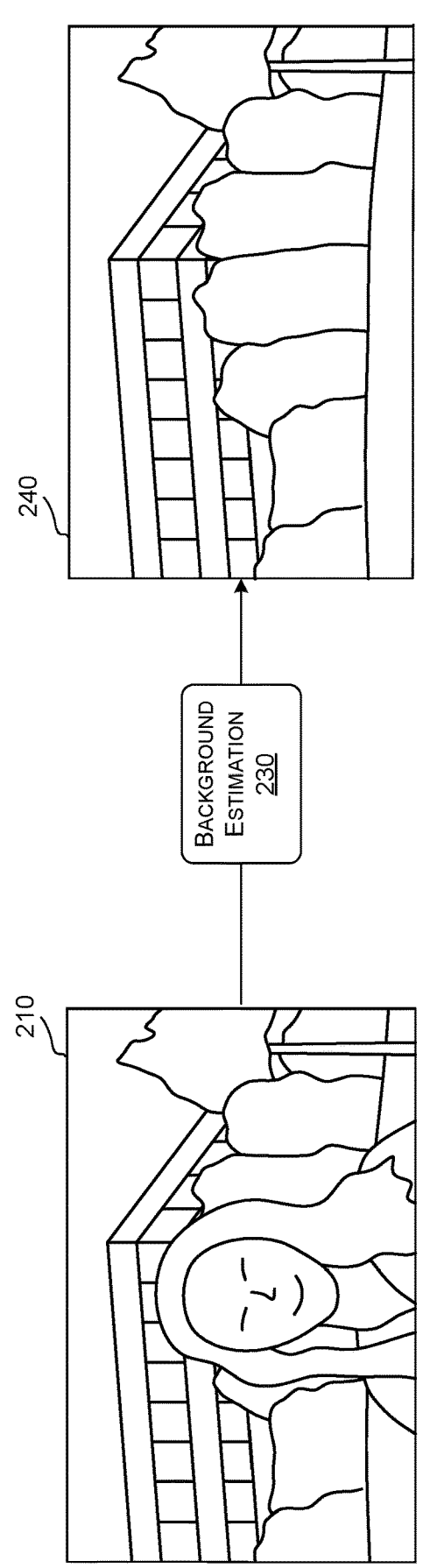
Figure 2B:
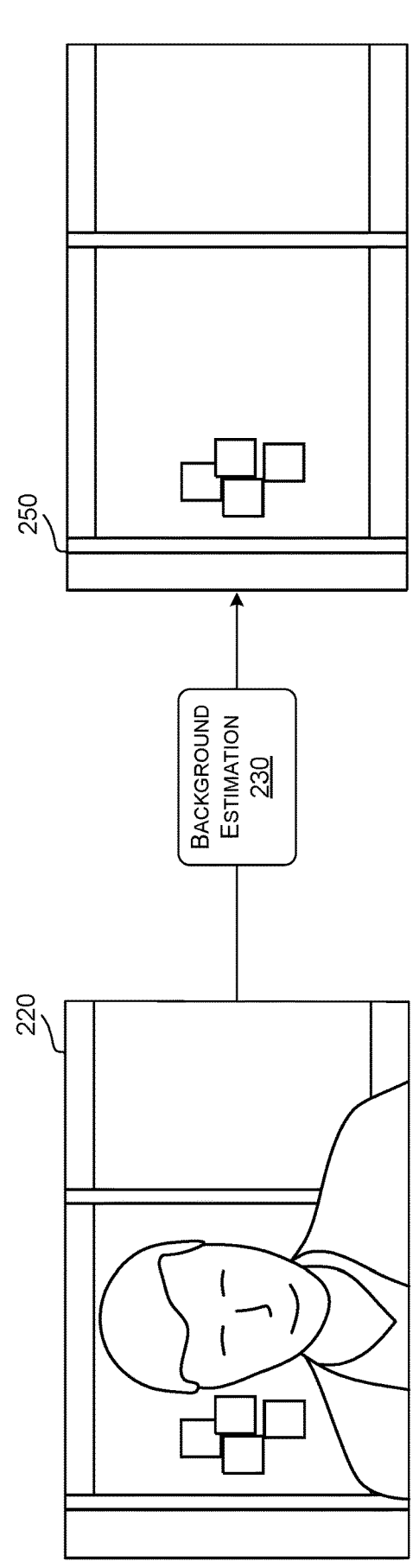

Next, as shown in FIG. 2B, images 210 and 220 are input to background estimation 230, which uses generative image model 100 to fill in the background behind each user. The result is background images 240 and 250, respectively. To implement the background estimation, each user can be segmented from their respective video feed, and the area around the user can be masked so that the generative image model fills in the background behind the user without modifying the surrounding visible background area.

Figure 2C:
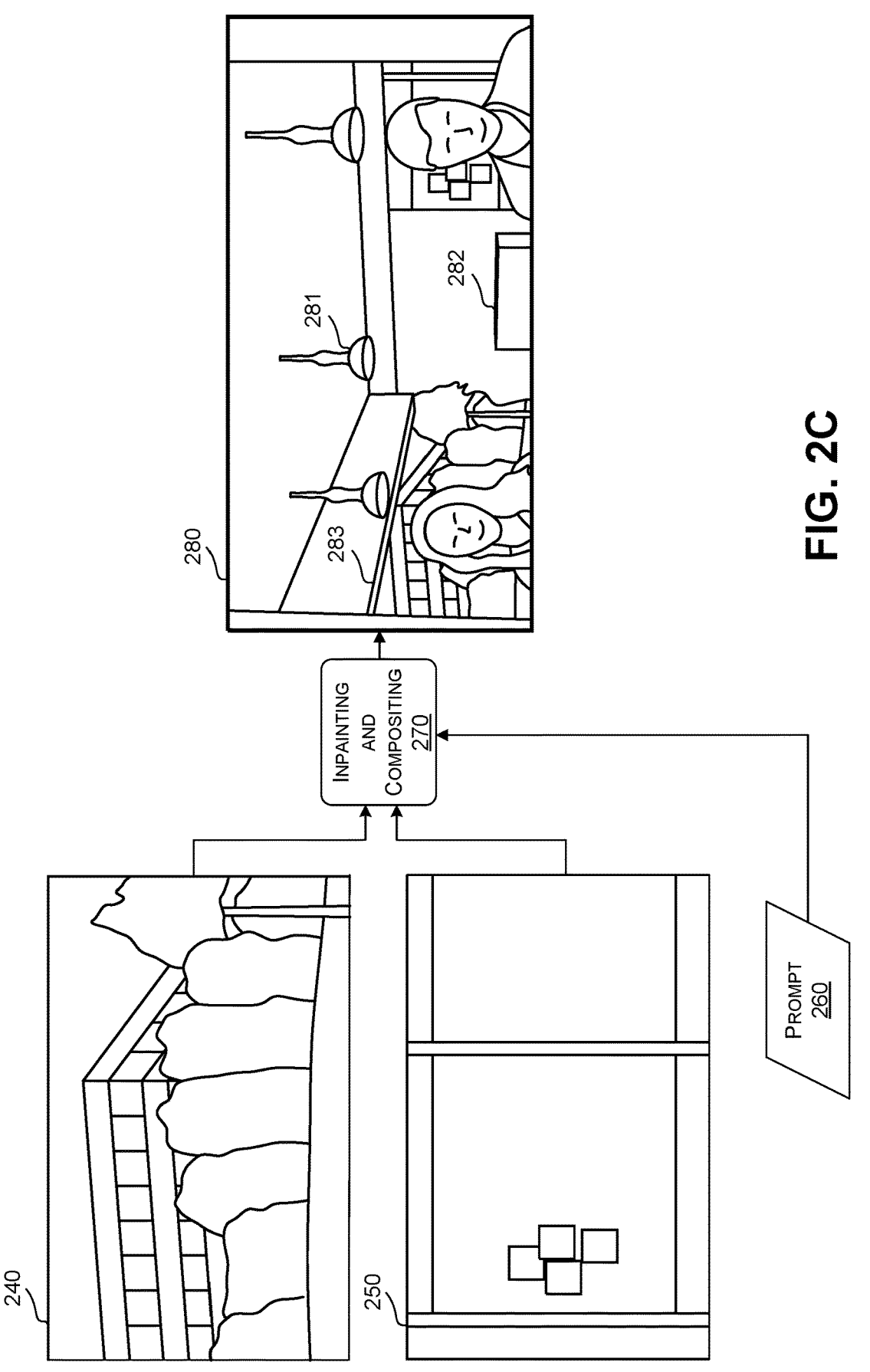

Next, as shown in FIG. 2C, background images 240 and 250 with prompt 260 are input to an inpainting and compositing process 270 to produce a blended image 280. Blended image 280 is generated by having the generative image model blend together the background images conditioned on the prompt and then compositing the segmented images of the users on the generated background. As discussed more below, the prompt can be derived based on an activity and/or theme selected by a user via control interface 200. Here, the user has selected a brainstorming activity with a library theme, so the generative image model blends the users' backgrounds into a library environment by adding features such as ceiling lamps 281 and desk 282. In addition, the outdoor background from image 240 is now visible via window 283, thus preserving the background while placing both users in an indoor library environment.

Figure 2D:
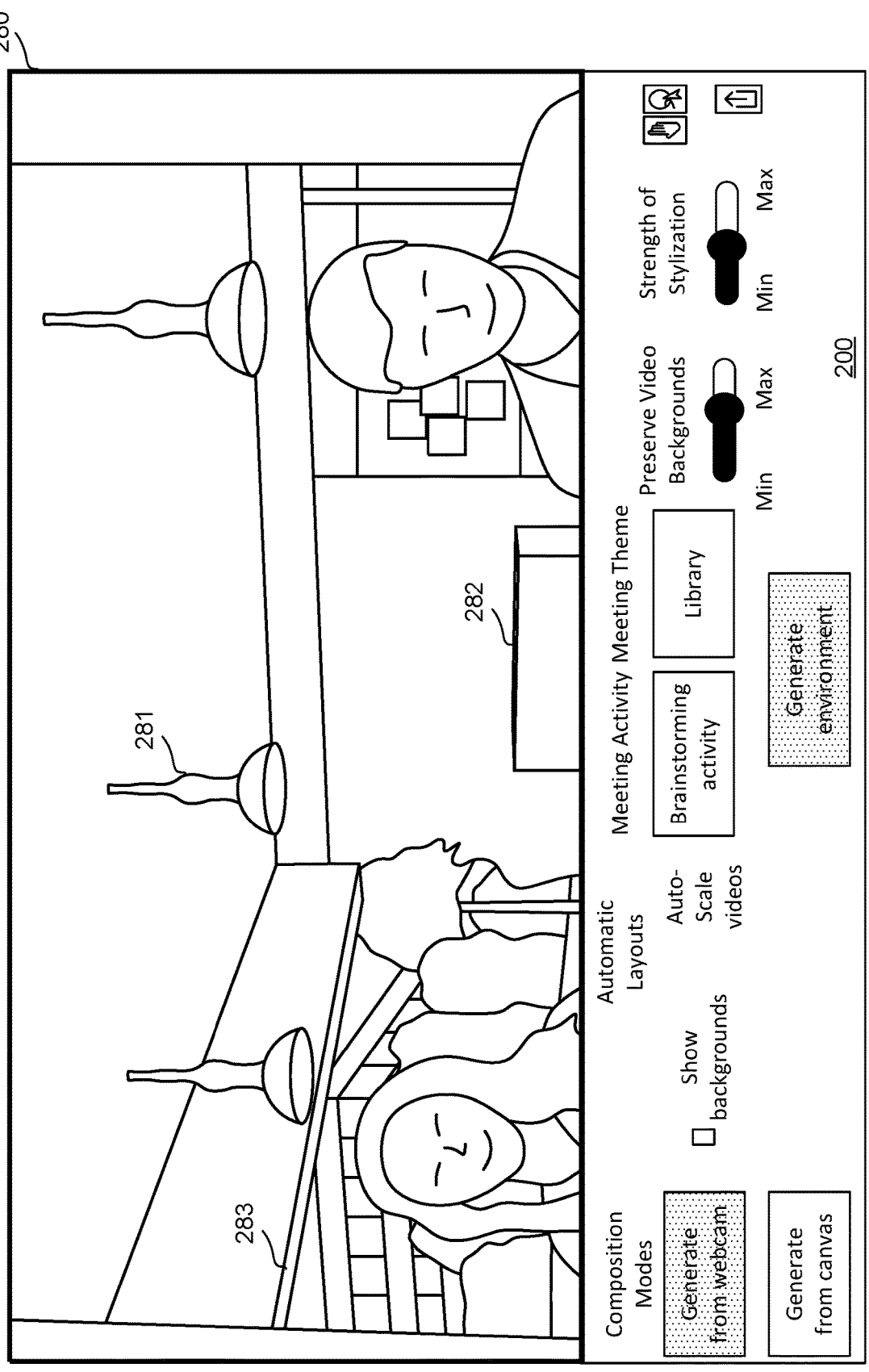

The final result is shown in FIG. 2D, where the composited inpainted image 280 is shown above control interface 200. Users can choose to accept the generated environment or regenerate a new environment, potentially after changing the activity, theme, or other settings of the control interface that are described in more detail below. If the users accept the background, the users can be segmented from the incoming video feeds and composited over the generated environment, which can remain static unless users choose to make further changes to the generated environment.

Image-to-Image Example

Figure 3A:
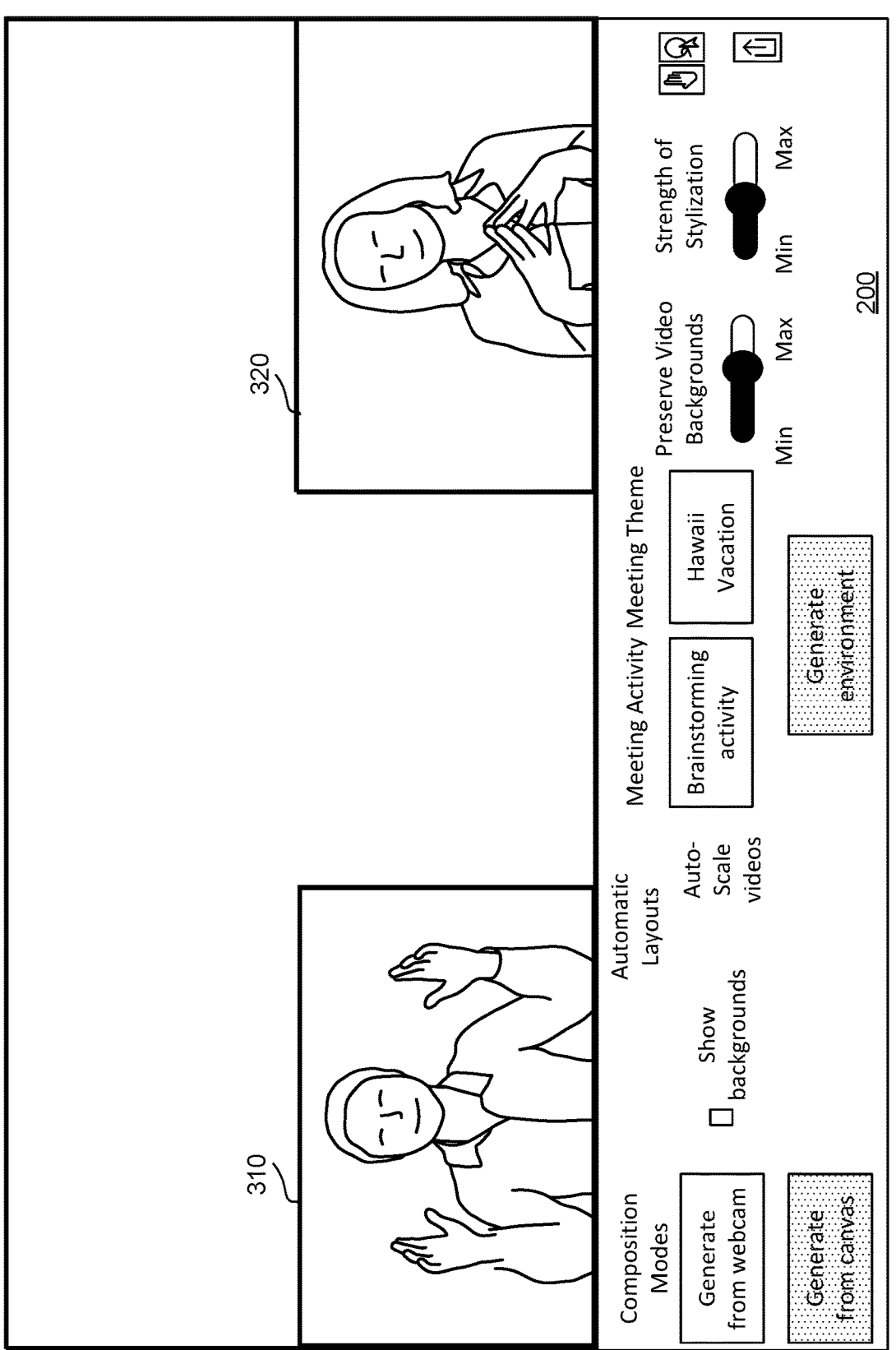
FIG. 3A-3C illustrate an example teleconferencing scenario involving image-to-image processing, consistent with some implementations of the present concepts.
Figure 3B:
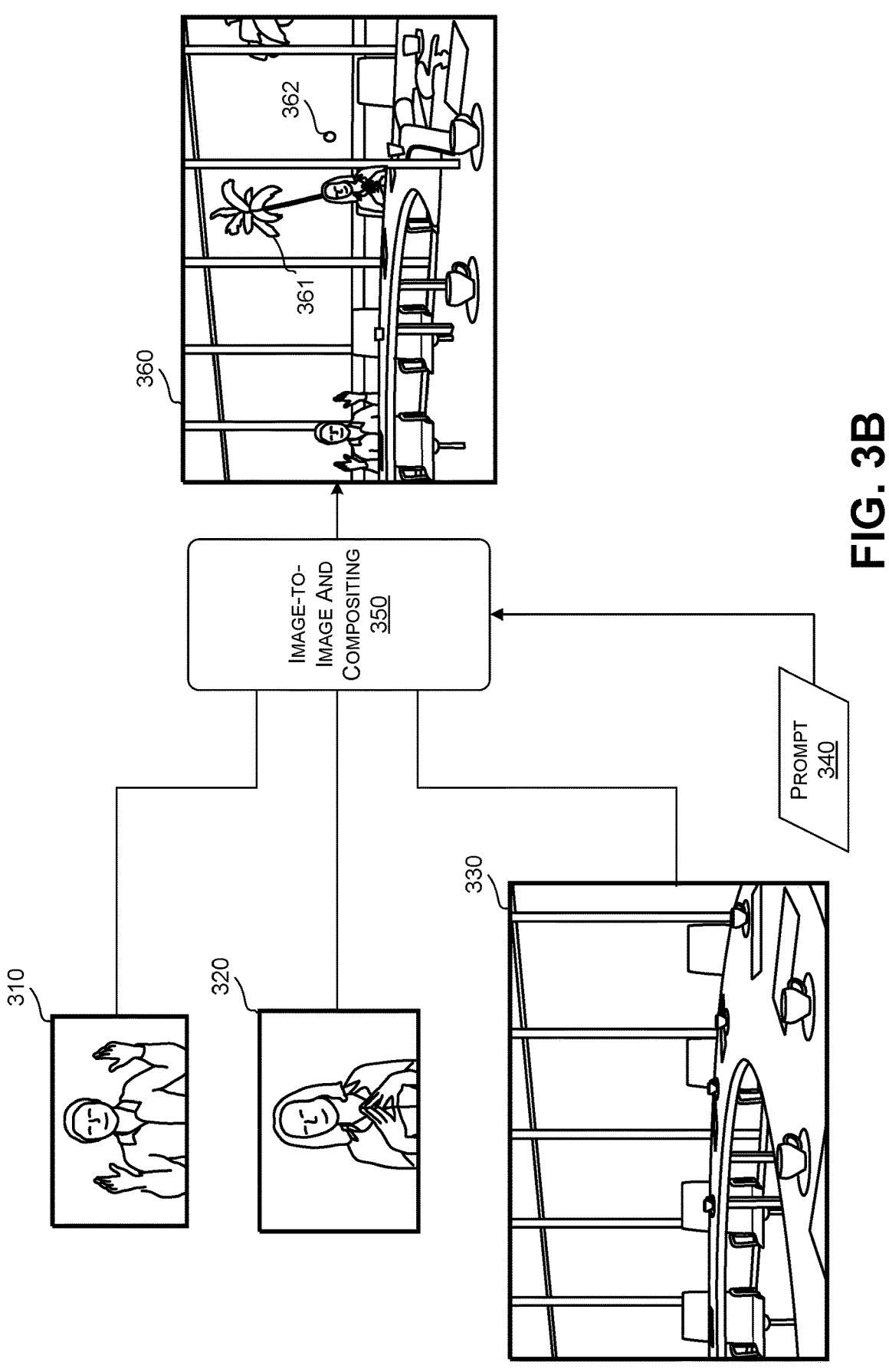
Figure 3C:
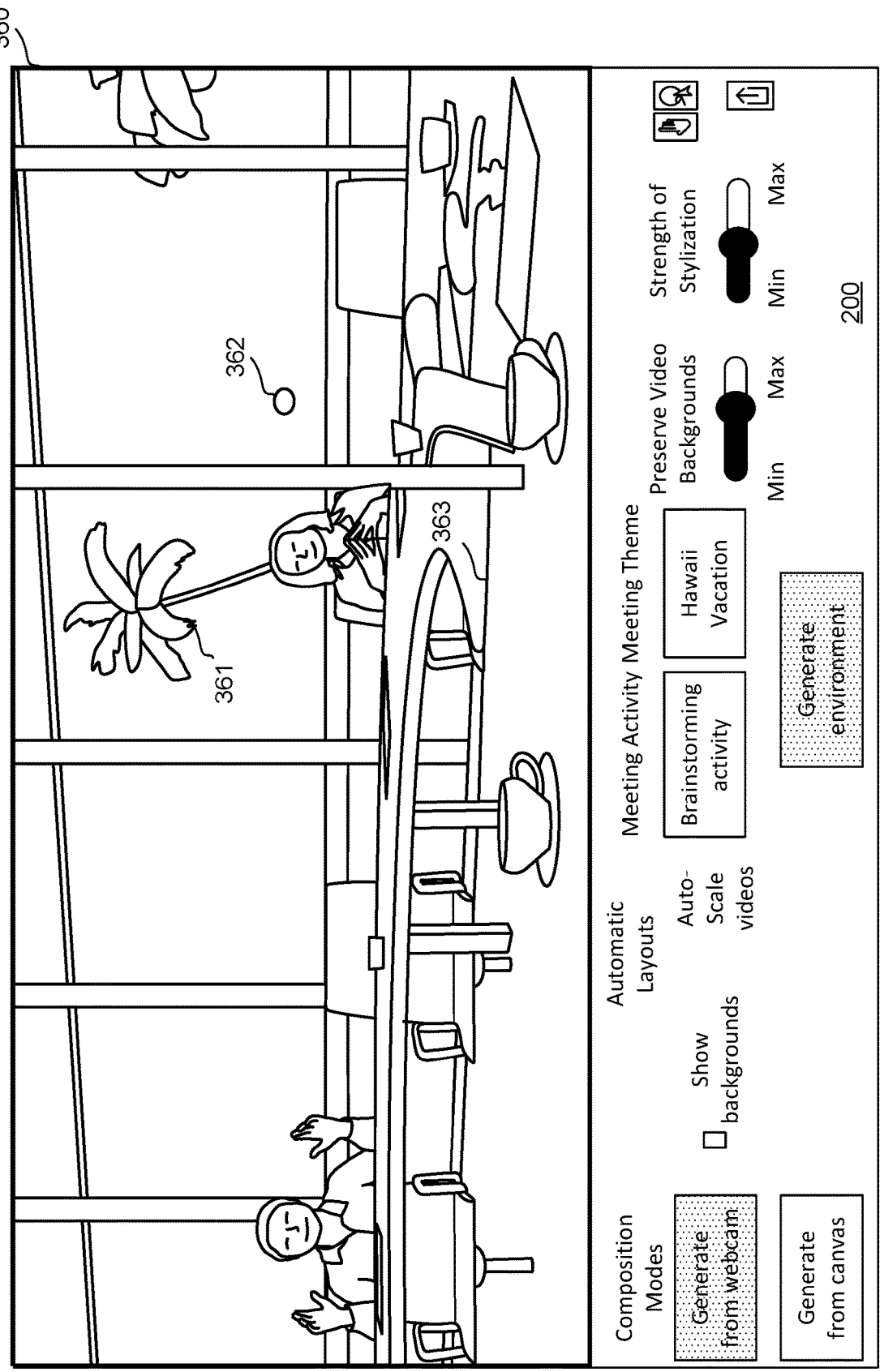

FIGS. 3A-3C show an example of how image-to-image processing can be employed in teleconferencing scenarios. As shown in FIG. 3A, control interface 200 is shown below an image 310 from a video signal received from a computing device of a first user, and an image 320 from a video signal received from a computing device of a second user. One of the users configures the control interface using a "generate from canvas" composition mode and enters a "brainstorming" activity with a "Hawaii vacation" theme.

Next, as shown in FIG. 3B, images 310 and 320 are input with another selected image 330 and prompt 340 to image-to-image and compositing processing 350. Here, image 330 can be an image selected by a particular user to guide the image generation process, such as an image of an office space that is familiar to all the participants in the teleconference. The generative image model 100 uses image 330 as an image prior for generating a restyled image 360 that restyles the user-selected image 330 as an image prior based on the prompt 340. Here, the user has selected a brainstorming activity with a Hawaii vacation theme, so the generative image model adds features such as a palm tree 361 and a sunset 362 to the generated image. The users are then composited over the restyled image as described previously.

The final result is shown in FIG. 3C, with the composited restyled image 360 shown with control interface 200. Again, users can choose to accept the generated environment or regenerate a new environment, potentially after changing the activity, theme, or other settings of the control interface that are described in more detail below. If the users accept the background, the users can be segmented from the incoming video feeds and composited over the generated environment, which can remain static unless users choose to make further changes to the generated environment.

Inpainting then Image to Image

Figure 4A:
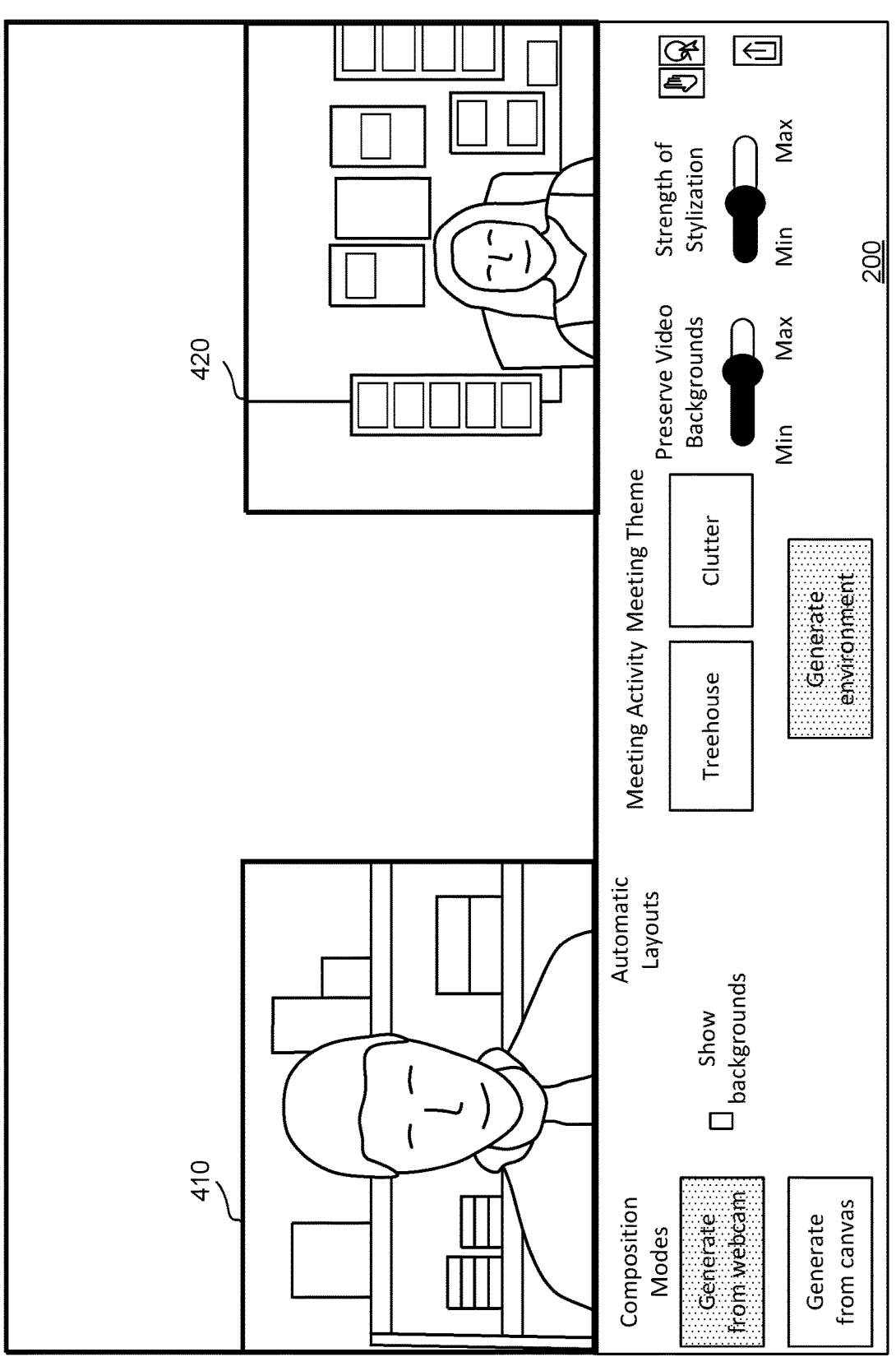
FIG. 4A-4C illustrate an example teleconferencing scenario with both inpainting and image-to-image processing, consistent with some implementations of the present concepts.
Figure 4B:
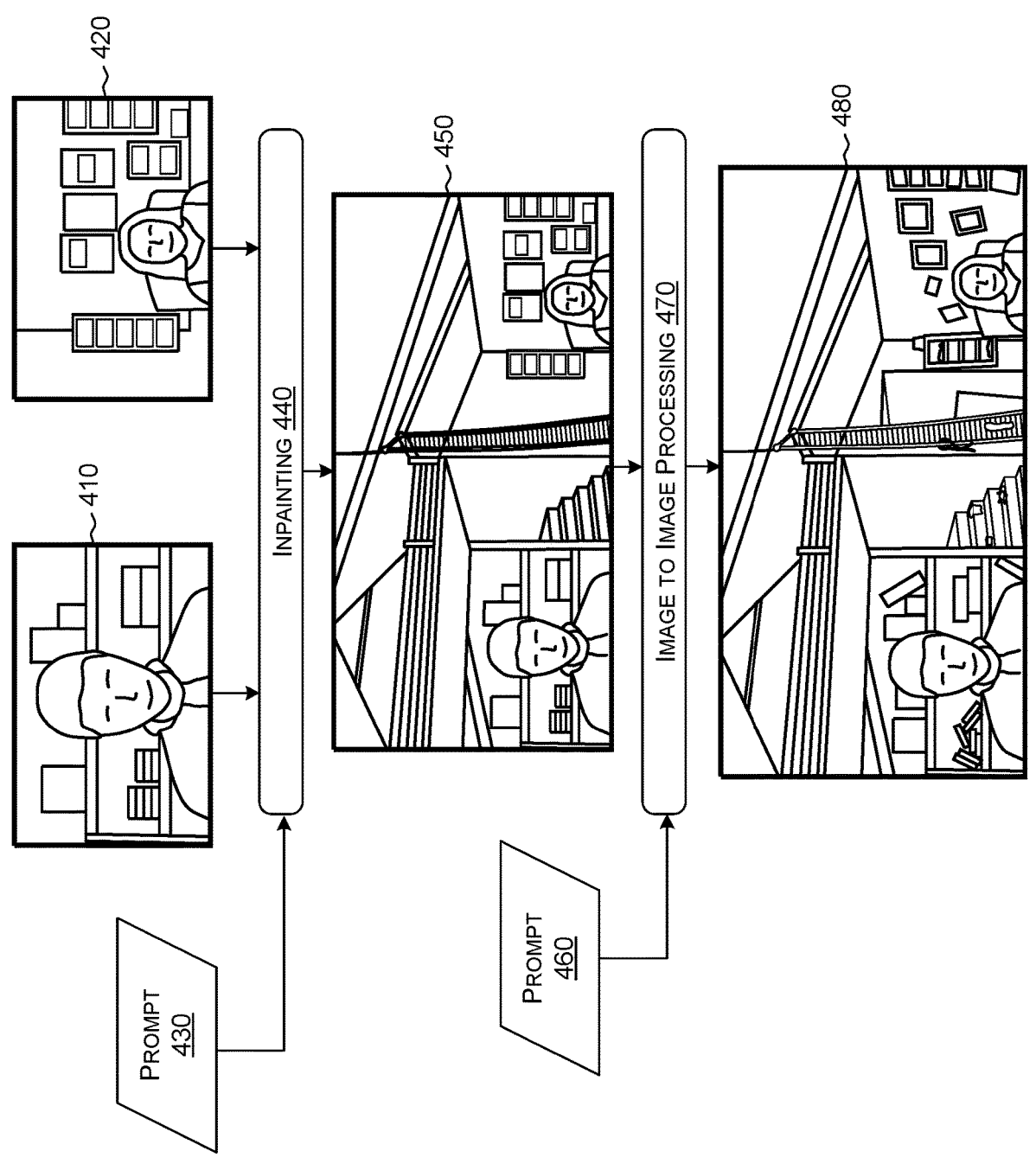
Figure 4C:
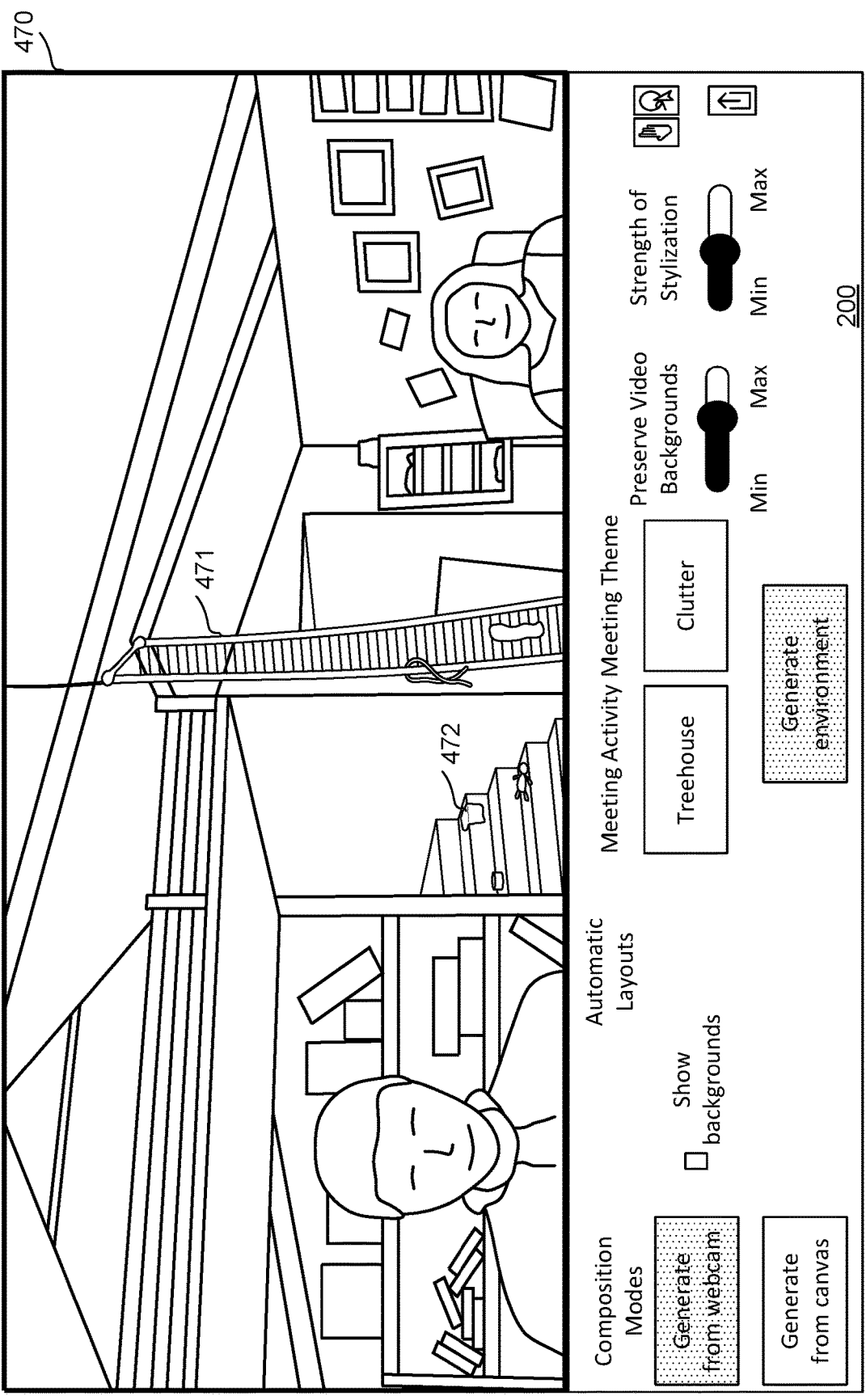

FIGS. 4A-4C show an example of how inpainting followed by image-to-image restyling can be employed in teleconferencing scenarios. Control interface 200 is shown below an image 410 from a video signal received from a computing device of a first user, and an image 420 from a video signal received from a computing device of a second user. One of the users configures the control interface using both the "generate from webcam" and "generate from webcam" composition mode with a "treehouse" activity and a "clutter" theme.

Next, as shown in FIG. 4B, images 410 and 420 are input with prompt 430, which uses generative image model 100 to perform inpainting and compositing in a manner similar to that described above with respect to FIGS. 2A-2D. The generative model can fill in the background behind each user with a treehouse, which the users are then composited over in inpainted image 450. Next, inpainted image 450 is input with prompt 460 to image-to-image processing 470, which restyles image 450 with a "clutter" theme, resulting in restyled image 480.

The result is shown in FIG. 4C, with the restyled image shown with control interface 200. The generative image model has added treehouse features such as rope ladder 471. In addition, the generative image model has added a cluttered stairwell 472, while also adding a cluttered look to books and picture frames shown in the respective user backgrounds.

Prompt Enhancement

Referring back to FIG. 2A, control interface 200 accepts two natural language inputs from the user-meeting activity, and a meeting theme. In the examples described above, the activities and themes were specified very briefly, using one or two words. One way to prompt generative image model 100 is to simply use the words entered directly by the user as prompts. However, it can be helpful to give generative image model 100 additional textual context for generating images.

Thus, some implementations can use a generative language model such as ChatGPT, BLOOM, PaLM, and/or LLAMA, to augment users' prompts with additional keywords. For instance, if the meeting activity is story-telling, and the theme of the meeting is mushroom forest, then a base prompt can be crafted from these user prompts, e.g., "mystical mushroom forest-themed environment for story-telling". A generative language model can then be employed to enhance this base prompt. To accomplish this, the generative language model can be provided with system prompt that leverages single-shot prompting, as below:

System Prompt to Generative Language Model:

Your task is to help the user create a prompt for a generative image model to generate an environment design. The user will specify an activity to occur in the environment and/or a theme for the space. You will provide a list of 4-5 types of objects to put in the environment and 4-5 distinct characteristics that describe the environment. The characteristics must be detailed and designed to generate visually appealing and cohesive results. Here is an example for a brainstorming activity:

```
{
    Objects: "whiteboards, plants, chairs, small
tables",
    Environment Characteristics: "bright, open
space, natural light, refreshing atmosphere,
varied textures"
}
```

Subsequently, an input prompt can be provided to the generative language model after the base prompt:

Input Prompt to Generative Language Model

Provide a list of 4-5 types of objects to put in this environment and 4-5 characteristics that describe this environment: Mystical mushroom forest-themed environment for story-telling. Return the output as comma-separated strings in JSON format: {Objects: string, Environment Characteristics: string}

The results of such a prompting strategy to a generative language model can result in the following output.

{Objects: "Mushrooms, Trees, Fairies, Moss-covered rocks, Lanterns",

Environment Characteristics": "Enchanting, Magical, Misty, Whimsical, Serene"}

This approach allows the dynamic generation of keywords for image generation that suit the varying needs of users in the meeting. The keywords inform what objects to expect in the generated image as well as the stylistic nature of the generation. Each of the generated keywords are now added to the base prompt crafted earlier. Additionally, a fixed set of terms-"highly detailed, intricate, sharp focus, smooth" can also be added to each prompt to the generate image model. Thus, a final prompt can be constructed as:

Final Prompt to Generative Image Model

Mystical mushroom forest-themed environment for story-telling; Giant mushrooms, Fairy houses, Moss-covered rocks, Glowing mushrooms, Enchanted flowers; Enchanting, Magical, Misty, Whimsical, Serene; highly detailed, intricate, sharp focus, smooth The prompt enhancement techniques described above can be employed for the inpainting, image-to-image, and combined scenarios described above.

Scene Editing

Figure 5:
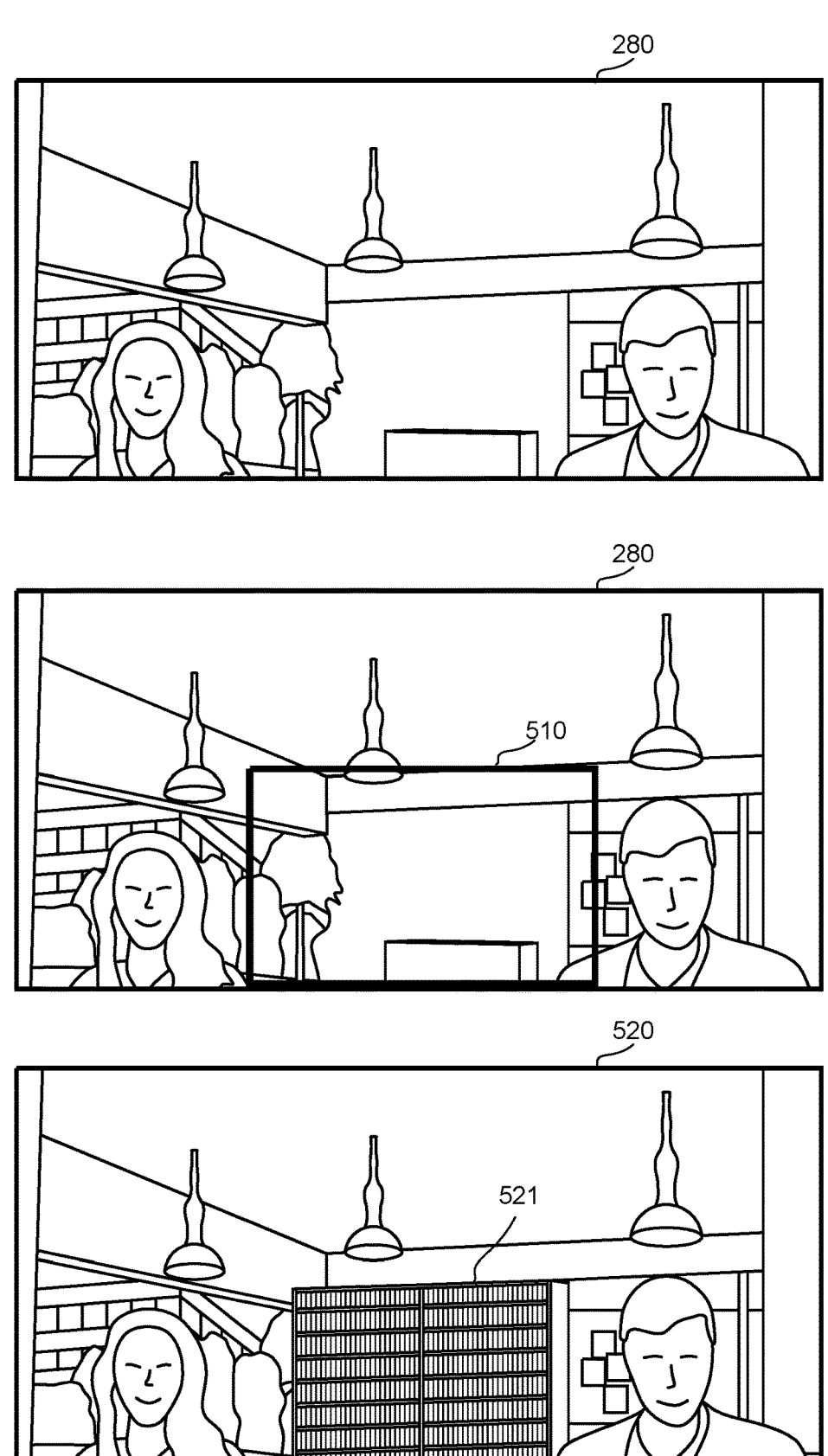
FIG. 5 illustrates an example of a user adding an object to a generated image, consistent with some implementations of the present concepts.

Referring back to FIG. 2D, the generated image 280 includes a desk 282. Assume that a user wishes to revise the environment by replacing the desk with a bookshelf instead. Referring to FIG. 5, the user can add a bounding box 510 to generated image 280, e.g., using a mouse, stylus, or touch input. The user can also enter a prompt such as "bookshelf" specifying an object to place in the bounding box. The generative image model 100 can be invoked based on the prompt to add a bookshelf object. Resulting image 520 includes the requested bookshelf object 521.

More generally, the scene editing techniques described herein allow users to correct small details by removing scene content (e.g., fixing a distorted area) or adding objects that they would expect to see in the meeting scenario (e.g., additional chairs to accommodate a new meeting participant). Users can identify an area that they want to regenerate and specify a text-based prompt. For instance, in some cases, another generative image model such as GLIGEN is employed (Li, et al., "Gligen: Open-set grounded text-to-image generation," Proceedings of the IEEE/CVF Conference on Computer Vision and Pattern Recognition, 2023). GLIGEN allows region-specific edits based on textual prompts and bounding box coordinates. GLIGEN is trained to consider the prompt, position, and scale of the specified region in relation to its surroundings, in order to generate a more cohesive and realistic result.

Layered Scenes

Figure 6:
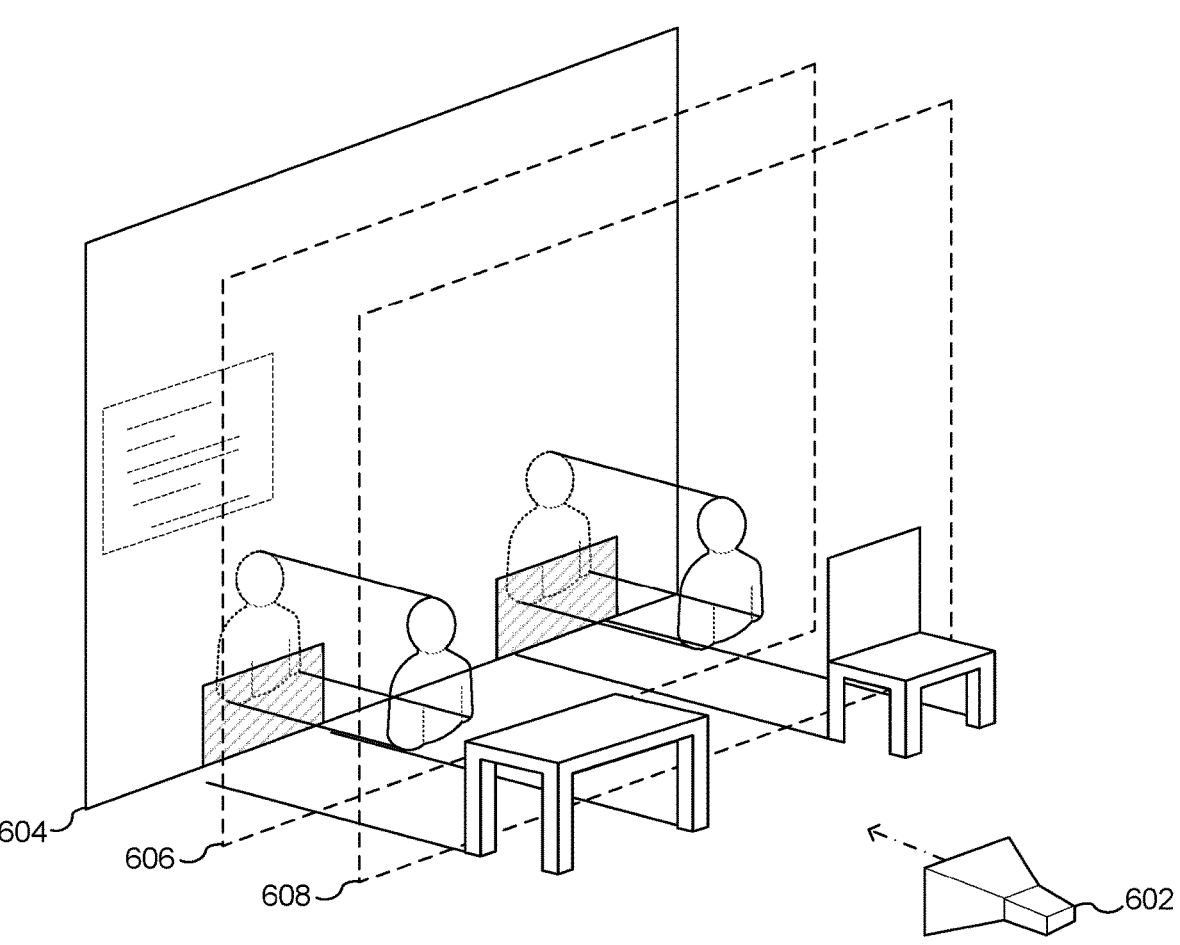
FIG. 6 illustrates an example of multiple layers employed to generate an image, consistent with some implementations of the present concepts.

To create the composite images described above, a layered approach can be employed. FIG. 6 shows an example where a scene camera 602 is employed to generate a composite image from background layer 604, person layer 606, and foreground layer 608. The background layer can include the actual backgrounds from the received video feeds as well as the background environment generated by the generative image model. The person layer can include the segmented users from the received video feeds. The foreground layer can include various objects that are placed in front of the user (e.g., table 363 in FIG. 3C).

One way to decide which objects are provided in foreground layer 608 is to perform a semantic segmentation of the image. For instance, a deep learning model can recognize areas of the image that are a conference table, chairs, etc., that might be good candidates to put as foreground objects. Other objects, such as windows, trees, or the sun might be better candidates to remain in the background layer 604.

Control Interface

Referring back to FIG. 2A, control interface 200 can give users the flexibility to control image generation in a number of different ways. For instance, as already noted, users can choose to generate an environment from their webcam backgrounds to invoke the inpainting mode of the generative image model. Alternatively, users can choose to generate the environment from a user-selected "canvas," or image prior to be used by the generative image model.

Users can also select whether to retain their video backgrounds and also to customize the proportion of the video backgrounds to retain. For instance, the retained region can be cropped from the center of the background image and ranges from the entire image received from the user (maximum preservation) to an empty region (minimum preservation).

Users can also control the strength of stylization by the generative image model, where higher stylization is implemented by giving the generative image model a relatively higher denoising strength. When inpainting, lower denoising strengths will cause the generative image model 100 to adhere more to the received user backgrounds as a prior when generating the inpainted image, whereas higher denoising strengths can cause the generative image model to inpaint the rest of the image with relatively unrelated content. When performing image-to-image restyling, lower denoising strengths will cause the generative image model 100 to adhere more to the selected user image as a prior when generating the inpainted image, whereas higher denoising strengths can cause the generative image model to restyle the selected user image with relatively unrelated content. Note that some implementations can also provide a user control that adjusts how strongly the generative image model adheres to a given prompt when generating an image, e.g., by manipulating a CFG ("Classifier-Free Guidance") Scale parameter.

Example System

Figure 7:
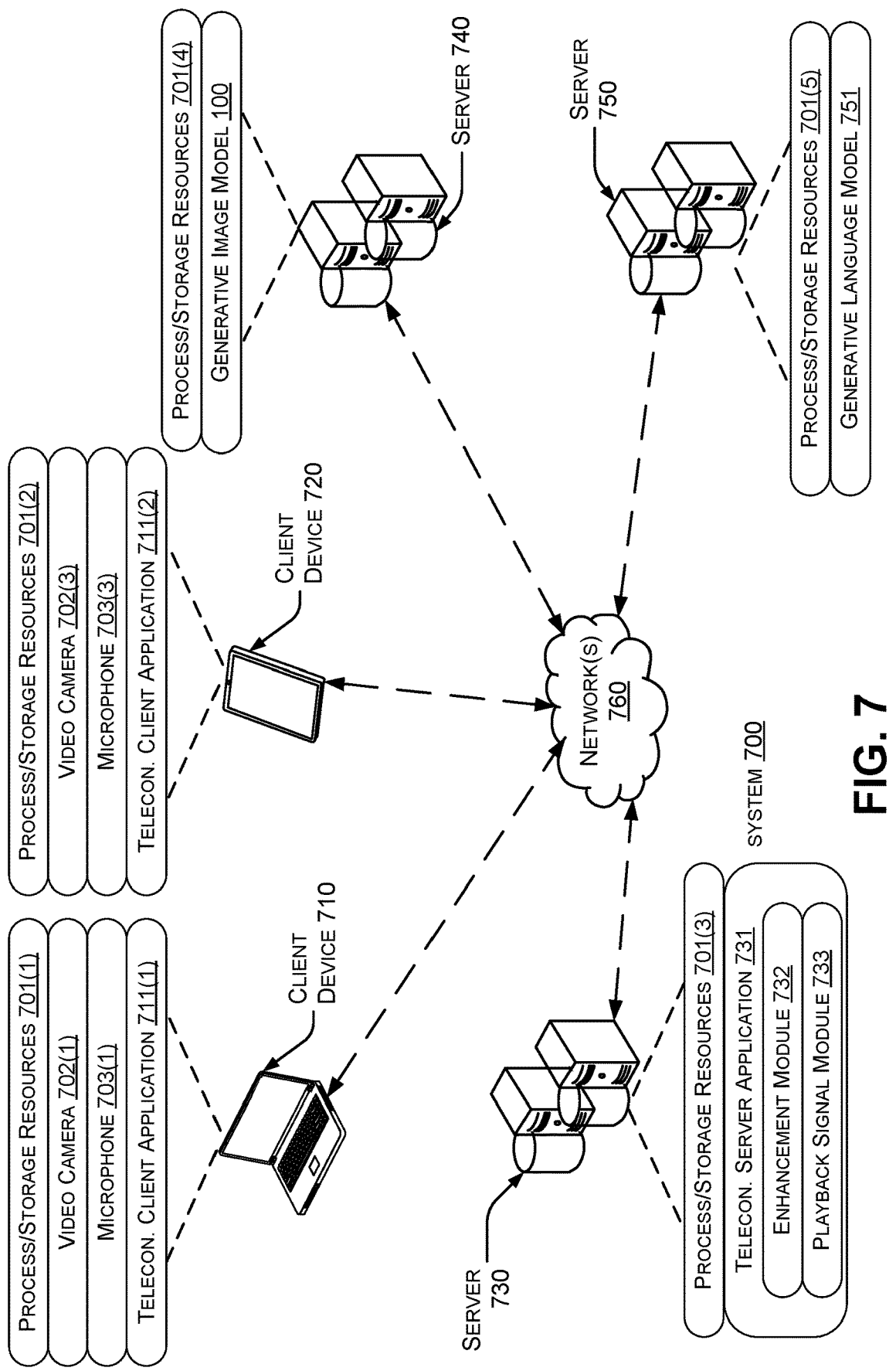
FIG. 7 illustrates an example of a system in which the disclosed implementations can be performed, consistent with some implementations of the present concepts.

The present implementations can be performed in various scenarios on various devices. FIG. 7 shows an example system 700 in which the present implementations can be employed, as discussed more below.

As shown in FIG. 7, system 700 includes a client device 710, a client device 720, a server 730, a server 740, and a server 750, connected by one or more network(s) 760. Note that the client devices can be embodied as mobile devices such as smart phones, laptops, or tablets, as well as stationary devices such as desktops, server devices, etc. Likewise, the server can be implemented using various types of computing devices. In some cases, any of the devices shown in FIG. 7, but particularly the server, can be implemented in data centers, server farms, etc.

Certain components of the devices shown in FIG. 7 may be referred to herein by parenthetical reference numbers. For the purposes of the following description, the parenthetical (1) indicates an occurrence of a given component on client device 710, (2) indicates an occurrence of a given component on client device 720, (3) indicates an occurrence of a given component on server 730, (4) indicates an occurrence of a given component on server 740, and (5) indicates an occurrence on server 750. Unless identifying a specific instance of a given component, this document will refer generally to the components without the parenthetical.

Generally, the devices 710, 720, 730, 740, and 750 may have respective processing/storage resources 701, which are discussed in more detail below. The devices may also have various modules that function using the processing and storage resources to perform the techniques discussed herein. Storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client devices 710 and 720 can have one or more video cameras 702 and microphones 703. In some cases, the video cameras and/or microphones can be integrated components of their respective devices. In other cases, the video cameras and/or microphones are external devices connected by wired or wireless connections to their respective devices. For instance, the video cameras of the respective client devices could be detachable universal serial bus (USB) web cameras or Bluetooth web cameras, and the microphones of the respective client devices can be incorporated into USB or Bluetooth headsets. In addition, note that the devices shown in FIG. 7 can also have displays and/or speakers (not shown).

Each client device can include respective instances of a teleconferencing client application 711. The teleconferencing client application can provide functionality for allowing users of the client devices to conduct audio/video teleconferencing with one another.

Teleconferencing server application 731 on server 730 can coordinate calls among the various other devices by communicating with the respective instances of the teleconferencing client application 711 over network(s) 760. For instance, the teleconferencing server application can have an enhancement module 732. The enhancement module can perform audio enhancement of audio/video signals received from the client devices, e.g., noise suppression, echo removal, etc. The enhancement module can also perform video enhancement, e.g., by sharpening a video signal, correcting low-light conditions, etc. In addition, the video enhancement can involve generating blended or restyled environments as described herein by communicating with generative image model 100 on server 740. For prompt expansion, the enhancement module can communicate with generative language model 751 on server 750.

Teleconferencing server application 731 can also have a playback signal module 733 that generates audio and/or video playback signals. For instance, the playback signal module can select, synchronize, and/or mix selected microphone signals from the respective client devices. The playback signal module 733 can also mix video signals together with the audio signals and communicate the mixed video/audio signals to participants in a call as playback signals.

Note that FIG. 7 illustrates only one of many plausible configurations. For instance, peer-to-peer implementations can be provided where one of the client devices performs functionality described herein as occurring on server 730.

Example Inpainting Method

Figure 8:
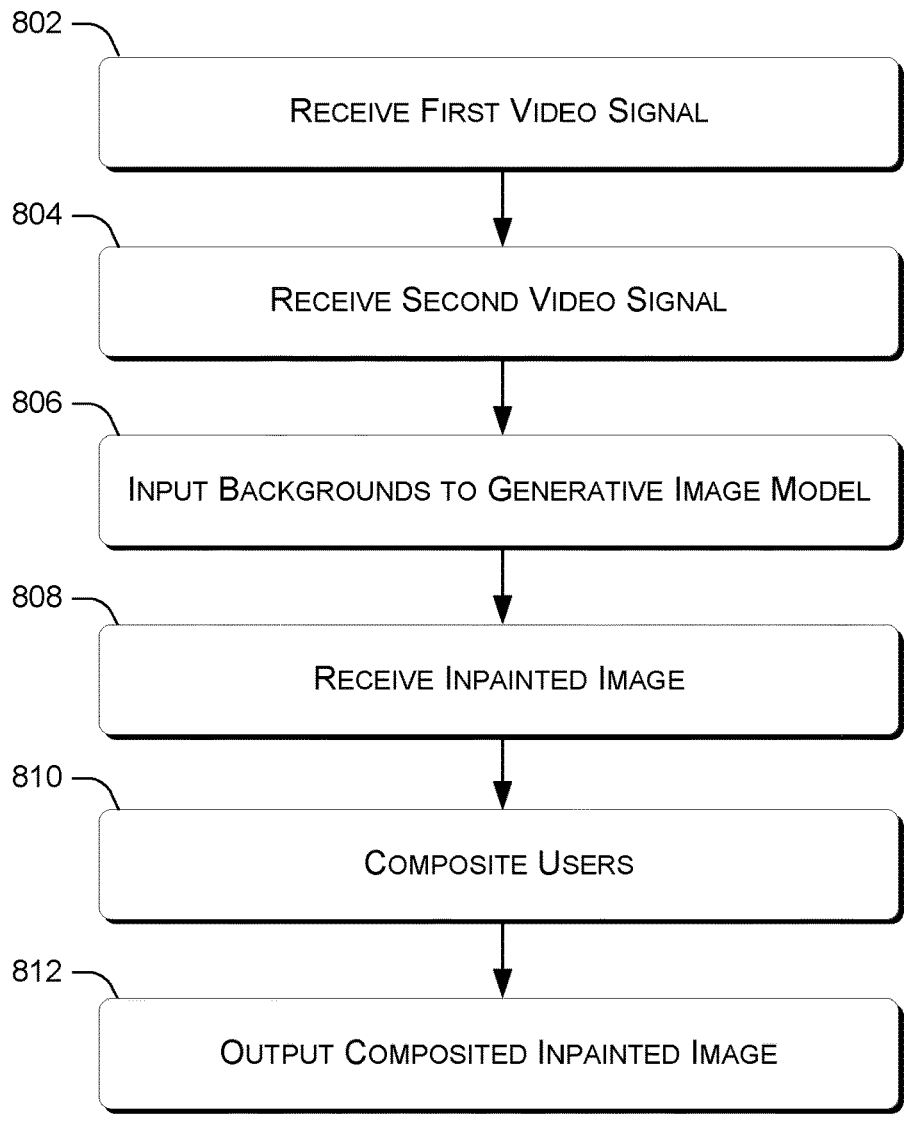
FIG. 8 illustrates a first example method or technique, consistent with some implementations of the disclosed techniques.

FIG. 8 illustrates an example method 800, consistent with some implementations of the present concepts. Method 800 can be implemented on many different types of devices, e.g., by one or more cloud servers, by a client device such as a laptop, tablet, or smartphone, or by combinations of one or more servers, client devices, etc.

Method 800 begins at block 802, where a first video signal captured by a first camera of a first computing device during a teleconference. The first video signal can include a first user and a first background of the first user.

Method 800 continues at block 804, where a second video signal captured by a second camera of a second computing device during the teleconference. The second video signal can include a second user and a second background of the second user.

Method 800 continues at block 806, where the first background and second background are input to the generative image model. For instance, the first and second backgrounds can be masked and the generative image model can be instructed to inpaint around the masks. In some implementations, the generative image model is employed to perform background replacement prior to the inpainting. As also noted above, the inpainting can be conditioned on a prompt relating to the teleconference.

Method 800 continues at block 808, where the inpainted image is received from the generative model. The inpainted image can serve as an environment for the teleconference.

Method 800 continues at block 810, where the first user and the second user are composited onto the inpainted image. For instance, the first user and the second user can be segmented from the video signals and then composited onto the inpainted image. Thus, the users themselves can be continually updated within an environment provided by the generative image model. The environment can remain static unless one of the users requests changes to the environment.

Method 800 continues at block 812, where the composited inpainted image is output. For instance, the composited inpainted image can be transmitted over a network to the first computing device, the second computing device, or another computing device of another user that is participating in the teleconference.

In some cases, some or all of method 800 is performed by a server. In other cases, some or all of method 800 is performed on another device, e.g., a client device. For instance, user devices can form a distributed peer-to-peer mesh and select a particular device to perform the functionality described above with respect to server 730.

Example Image-to-Image Method

Figure 9:
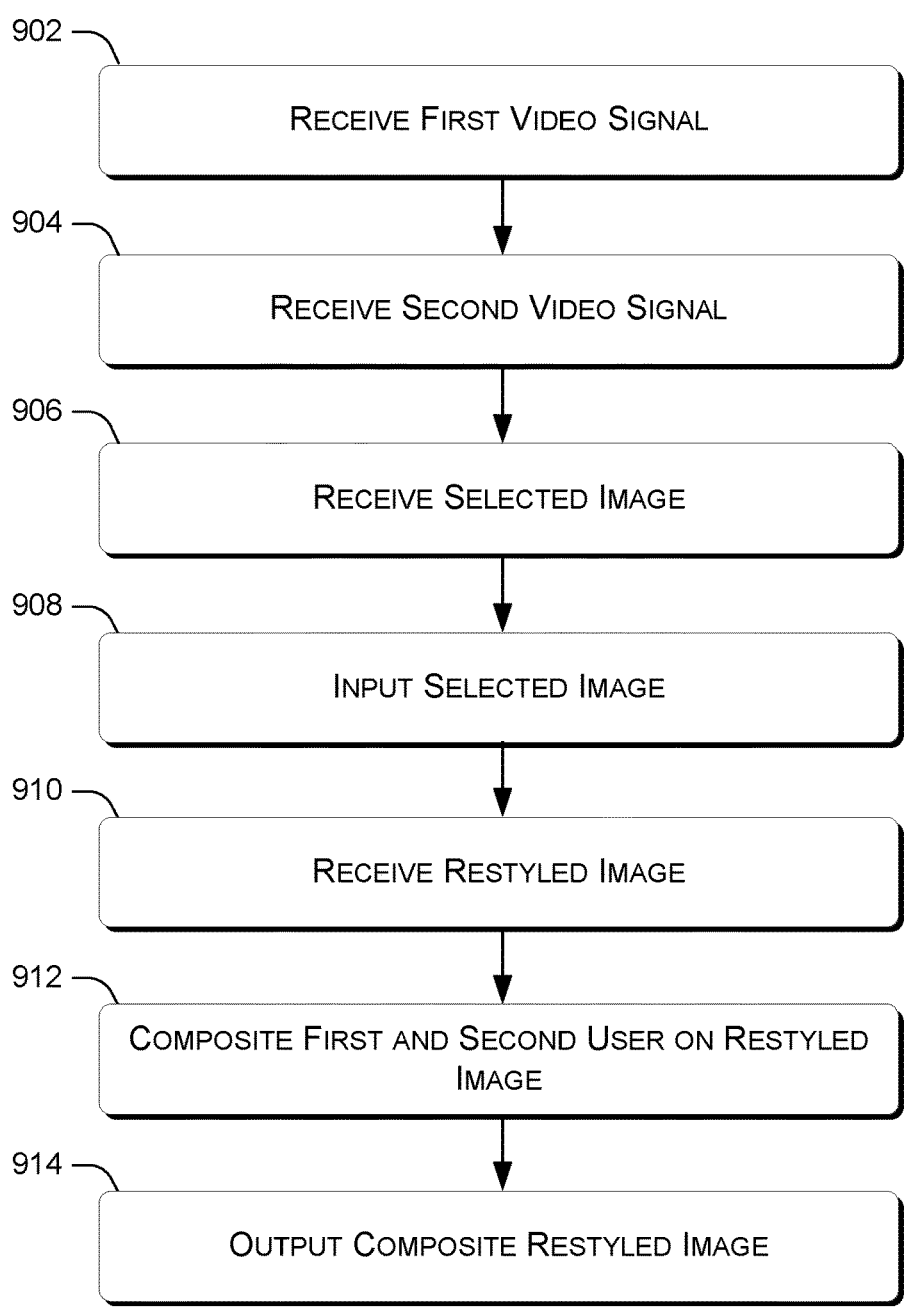
FIG. 9 illustrates a second example method or technique, consistent with some implementations of the disclosed techniques.

FIG. 9 illustrates an example method 900, consistent with some implementations of the present concepts. Method 900 can be implemented on many different types of devices, e.g., by one or more cloud servers, by a client device such as a laptop, tablet, or smartphone, or by combinations of one or more servers, client devices, etc.

Method 900 begins at block 902, where a first video signal captured by a first camera of a first computing device during a teleconference. The first video signal can include a first user and a first background of the first user.

Method 900 continues at block 904, where a second video signal captured by a second camera of a second computing device during the teleconference. The second video signal can include a second user and a second background of the second user.

Method 900 continues at block 906, where a selected image is received from the first computing device, the second computing device, or another computing device. The selected image can be an image that a user would like to use as an environment for the teleconference.

Method 900 continues at block 908, where the selected image is input to a generative image model for restyling. For instance, a prompt relating to the teleconference can also be input to the generative image model, and the generative image model can restyle the selected image based on the prompt.

Method 900 continues at block 910, where the restyled image is received from the generative model. The restyled image can serve as an environment for the teleconference.

Method 900 continues at block 912, where the first user and the second user are composited onto the restyled image. For instance, the first user and the second user can be segmented from the video signals and then composited onto the restyled image. Thus, the users themselves can be continually updated within an environment provided by the generative image model. The environment can remain static unless one of the users' requests changes to the environment.

Method 900 continues at block 912, where the composited restyled image is output. For instance, the composited restyled image can be transmitted over a network to the first computing device, the second computing device, or another computing device of another user that is participating in the teleconference.

In some cases, some or all of method 900 is performed by a server. In other cases, some or all of method 900 is performed on another device, e.g., a client device. For instance, user devices can form a distributed peer-to-peer mesh and select a particular device to perform the functionality described above with respect to server 730.

Additional Implementations

In some implementations, generative language models can be employed as context engines to automatically place users in a given scene. In such implementations, semantic labels and relative scales of salient objects in generated environments can be employed to query a generative image model to return a list of appropriate objects to place users behind. A generative image model can be employed to generate the objects suggested by the generative image model. Then, the hidden surface removal techniques described above can be employed to place users behind the objects.

In addition, some implementations can compute weights for users' videos that control how much of the backgrounds are preserved. First, semantic labels for each object in users' respective video backgrounds, e.g., using PixelLib. Then, a similarity score could be computed between each description and the *Meeting Activity and Theme* prompts (e.g., through natural language understanding techniques or querying a generative language model to assess similarity). Then, a larger proportion of backgrounds could be preserved for users with backgrounds that are similar to the meeting prompts.

In addition, note that the disclosed techniques can be employed for scenarios where users are not necessarily present in the final image. For instance, consider a scenario where an object such as a white board or desk is presented instead of one of the participants in a teleconference. A video feed of the object can be captured and used to generate a new image using either the inpainting or image-to-image restyling techniques described above. The object can be segmented out of the video feed and composited over an inpainted or restyled image so that other users can see changes to the object In some cases, a hybrid experience is provided where the final image includes one or more of the participants in a given teleconference along with an object segmented from a video feed of another participant. In some cases, a participant can designate a target area (e.g., by drawing a box on their video feed) that is extracted and used for image generation, and then can place objects (such as a desk or whiteboard) in the target area for presentation to the other participants.

In addition, note that some implementations can utilize a generative image model for rendering video frames instead of a static image environment. In such implementations, video signals that include users can be input to a generative image model, and the generative image model can output video having the users provided in an environment generated by the generative image model. For instance, the environment can be based on user backgrounds, an image prior, and/or one or more prompts as described previously. In such implementations, the users do not necessarily need to be composited onto the background generated by the generative image model as a separate step, but rather the generative image model generates the video feed having the users present therein.

Furthermore, some implementations can provide different images to different users. For instance, different image priors, prompts, denoising strengths, backgrounds, or other parameters could be used to generate images for different user computing devices. In other cases, different segmentation and/or composition techniques are employed for different user computing devices, e.g., users may receive images where the other users are composited over an image but not themselves. These techniques can be implemented on a server that generates and distributes different images to each device participating in a teleconference, and/or by having the respective client devices perform part or all of the image generation locally.

For instance, consider a scenario where each user does not see themselves, but sees the other participants in a call as if they were at different locations in the same room. This could be implemented using a large background image generated by a generative image model, where each respective user has a corresponding location relative to the background image. A portion of the background can be cropped out behind each respective user, and then that user can be composited over their respective portion of the background. Alternatively, each user could have a separate background image provided by the generative image model, but each of the background images could be generated using the same prompt to create a thematic relationship among the respective backgrounds.

Technical Effect

As noted, conventional teleconferencing techniques tend to place the participants in generic, unfamiliar spaces. The disclosed techniques can leverage generative image models to provide environments for meetings that relate to the purpose of the meeting. By inpainting between user backgrounds, objects in the users' local environments can be presented in a unified, blended environment. In addition, by restyling images of familiar spaces, users can be provided experiences that resemble familiar locations without actually needing to be physically present in those locations.

Device Implementations

As noted above with respect to FIG. 7, system 700 includes several devices, including a client device 710, a client device 720, a server 730, a server 740, and a server 750. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. Processors and storage can be implemented as separate components or integrated together as in computational RAM. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.), microphones, etc. Devices can also have various output mechanisms such as printers, monitors, speakers, etc.

Also note that the devices described herein can function in a stand-alone or cooperative manner to implement the described techniques. For example, the methods and functionality described herein can be performed on a single computing device and/or distributed across multiple computing devices that communicate over network(s) 760. Without limitation, network(s) 760 can include one or more local area networks (LANs), wide area networks (WANs), the Internet, and the like.

Various examples are described above. Additional examples are described below. One example includes a computer-implemented method comprising receiving a first video signal captured by a first camera of a first computing device during a teleconference, the first video signal including a first user and a first background of the first user, receiving a second video signal captured by a second camera of a second computing device during the teleconference, the second video signal including a second user and a second background of the second user, inputting at least the first background and the second background to a generative image model and instructing the generative image model to inpaint around the first background and the second background, receiving an inpainted image from the generative image model, compositing the first user and the second user on the inpainted image to obtain a composited inpainted image, and outputting the composited inpainted image.

Another example can include any of the above and/or below examples where the outputting comprises transmitting the composited inpainted image over a network during the teleconference to the first computing device, the second computing device, or another computing device.

Another example can include any of the above and/or below examples where the computer-implemented method further comprises inputting a first mask for the first background and a second mask for the second background to the generative image model, the generative image model preserving the first background within the first mask and the second background within the second mask when generating the inpainted image.

Another example can include any of the above and/or below examples where the computer-implemented method further comprises segmenting the first user from the first video signal and the second user from the second video signal to perform the compositing.

Another example can include any of the above and/or below examples where the computer-implemented method further comprises receiving user input specifying an extent of background preservation, and determining respective sizes for the first mask and the second mask based on the user input.

Another example can include any of the above and/or below examples where the computer-implemented method further comprises receiving a base prompt relating to the teleconference from the first user or the second user, and conditioning the generative image model based at least on the base prompt.

Another example can include any of the above and/or below examples where the conditioning comprises inputting at least part of the base prompt to a generative language model to obtain an expanded prompt, and inputting the expanded prompt to the generative image model.

Another example can include any of the above and/or below examples where the computer-implemented method further comprises receiving user input identifying a selected area of the composited inpainted image and a description of an object to place in the selected area, and instructing the generative image model to place the object in the selected area.

Another example can include any of the above and/or below examples where the compositing comprises performing hidden surface removal to place at least part of the first user or the second user behind an object in the composited inpainted image.

Another example can include any of the above and/or below examples where the computer-implemented method further comprises instructing the generative image model to restyle the composite inpainted image using an image-to-image technique based at least on a restyling prompt.

Another example can include a computer-implemented method comprising receiving a first video signal captured by a first camera of a first computing device during a teleconference, the first video signal including a first user, receiving a second video signal captured by a second camera of a second computing device during the teleconference, the second video signal including a second user, receiving a selected image, inputting at least the selected image to a generative image model and instructing the generative image model to generate a restyled image from the selected image, receiving the restyled image from the generative image model, compositing the first user and the second user on the restyled image to obtain a composited restyled image, and outputting the composited restyled image.

Another example can include any of the above and/or below examples where the computer-implemented method further comprises receiving a base prompt relating to the teleconference from the first user or the second user; and conditioning the generative image model based at least on the base prompt.

Another example can include any of the above and/or below examples where the conditioning comprises inputting at least part of the base prompt to a generative language model to obtain an expanded prompt, and inputting the expanded prompt to the generative image model.

Another example can include any of the above and/or below examples where the computer-implemented method further comprises employing another machine learning model to preserve at least one of salient features or a layout of the selected image.

Another example can include a system comprising a processor and a storage medium storing instructions which, when executed by the processor, cause the system to receive a first video signal captured by a first camera of a first computing device during a teleconference, the first video signal including a first user and a first background of the first user, receive a second video signal captured by a second camera of a second computing device during the teleconference, the second video signal including a second user and a second background of the second user, input the first background and the second background to a generative image model and instruct the generative image model to inpaint around the first background and the second background, receive an inpainted image from the generative image model, composite the first user and the second user on the inpainted image to obtain a composited inpainted image, and send the composited inpainted image to at least one of the first computing device, the second computing device, or another computing device of another user.

Another example can include any of the above and/or below examples where the instructions, when executed by the processor, cause the system to input a prompt relating to the teleconference to the generative image model.

Another example can include any of the above and/or below examples where the instructions, when executed by the processor, cause the system to input a first mask for the first background and a second mask for the second background to the generative image model, the generative image model preserving the first background within the first mask and the second background within the second mask when generating the inpainted image.

Another example can include any of the above and/or below examples where the instructions, when executed by the processor, cause the system to receive user input identifying a selected area of the composited inpainted image and a description of an object to place in the selected area, and instruct the generative image model to place the object in the selected area, the composited inpainted image having the object in the selected area.

Another example can include any of the above and/or below examples where the instructions, when executed by the processor, cause the system to instruct the generative image model to restyle the composite inpainted image using an image-to-image technique based at least on a restyling prompt.

Another example can include any of the above and/or below examples where the instructions, when executed by the processor, cause the system to determine the restyling prompt based on user input.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A computer-implemented method comprising:

receiving a first video signal captured by a first camera of a first computing device during a teleconference, the first video signal depicting a first user and a first background of the first user;

receiving a second video signal captured by a second camera of a second computing device during the teleconference, the second video signal depicting a second user and a second background of the second user;

inputting at least a first mask for the first background and a second mask for the second background to a generative image model and instructing the generative image model to inpaint around the first background and the second background;

receiving an inpainted image from the generative image model, the generative image model preserving the first background based on the first mask and the second background based on the second mask when generating the inpainted image;

compositing the first user and the second user on the inpainted image to obtain a composited inpainted image; and outputting the composited inpainted image.

2. The computer-implemented method of claim 1, wherein the outputting comprises transmitting the composited inpainted image over a network during the teleconference to the first computing device, the second computing device, or another computing device.

3. The computer-implemented method of claim 1, further comprising:

segmenting the first user from the first video signal and the second user from the second video signal to perform the compositing.

4. The computer-implemented method of claim 1, further comprising:

receiving user input specifying an extent of background preservation; and determining respective sizes for the first mask and the second mask based on the user input.

5. The computer-implemented method of claim 1, further comprising:

receiving a base prompt relating to the teleconference from the first user or the second user; and conditioning the generative image model based at least on the base prompt.

6. The computer-implemented method of claim 5, wherein the conditioning comprises:

inputting at least part of the base prompt to a generative language model to obtain an expanded prompt; and inputting the expanded prompt to the generative image model.

7. The computer-implemented method of claim 1, further comprising:

receiving user input identifying a selected area of the composited inpainted image and a description of an object to place in the selected area; and instructing the generative image model to place the object in the selected area.

8. The computer-implemented method of claim 1, wherein the compositing comprises:

performing hidden surface removal to place at least part of the first user or the second user behind an object in the composited inpainted image.

9. The computer-implemented method of claim 1, further comprising:

instructing the generative image model to restyle the composited inpainted image using an image-to-image technique based at least on a restyling prompt.

10. A system comprising:

a processor; and a storage medium storing instructions which, when executed by the processor, cause the system to:

receive a first video signal captured by a first camera of a first computing device during a teleconference, the first video signal depicting a first user and a first background of the first user;

receive a second video signal captured by a second camera of a second computing device during the teleconference, the second video signal depicting a second user and a second background of the second user;

input at least a first mask for the first background and a second mask for the second background to a generative image model and instruct the generative image model to inpaint around the first background and the second background;

receive an inpainted image from the generative image model, the generative image model preserving the first background based on the first mask and the second background based on the second mask when generating the inpainted image;

composite the first user and the second user on the inpainted image to obtain a composited inpainted image; and send the composited inpainted image to at least one of the first computing device, the second computing device, or another computing device of another user.

11. The system of claim 10, wherein the instructions, when executed by the processor, cause the system to:

input a prompt relating to the teleconference to the generative image model.

12. The system of claim 10, wherein the instructions, when executed by the processor, cause the system to:

receive user input identifying a selected area of the composited inpainted image and a description of an object to place in the selected area; and instruct the generative image model to place the object in the selected area, the composited inpainted image having the object in the selected area.

13. The system of claim 10, wherein the instructions, when executed by the processor, cause the system to:

instruct the generative image model to restyle the composited inpainted image using an image-to-image technique based at least on a restyling prompt.

14. The system of claim 13, wherein the instructions, when executed by the processor, cause the system to:

determine the restyling prompt based on user input.

15. A hardware computer-readable storage device storing computer-readable instructions which, when executed by a hardware processing device, cause the hardware processing device to perform acts comprising:

receiving a first video signal captured by a first camera of a first computing device during a teleconference, the first video signal depicting a first user and a first background of the first user;

receiving a second video signal captured by a second camera of a second computing device during the teleconference, the second video signal depicting a second user and a second background of the second user;

inputting at least a first mask for the first background and a second mask for the second background to a generative image model and instructing the generative image model to inpaint around the first background and the second background;

receiving an inpainted image from the generative image model, the generative image model preserving the first background based on the first mask and the second background based on the second mask when generating the inpainted image;

compositing the first user and the second user on the inpainted image to obtain a composited inpainted image; and outputting the composited inpainted image.

16. The hardware computer-readable storage device of claim 15, the acts further comprising:

segmenting the first user from the first video signal and the second user from the second video signal to perform the compositing.

17. The hardware computer-readable storage device of claim 15, the acts further comprising:

receiving user input specifying an extent of background preservation; and determining respective sizes for the first mask and the second mask based on the user input.

18. The hardware computer-readable storage device of claim 15, the acts further comprising:

receiving user input identifying a selected area of the composited inpainted image and a description of an object to place in the selected area; and instructing the generative image model to place the object in the selected area, wherein the composited inpainted image includes the object placed in the selected area.

19. The hardware computer-readable storage device of claim 15, the acts further comprising:

performing hidden surface removal to place at least part of the first user or the second user behind an object in the composited inpainted image.

20. The hardware computer-readable storage device of claim 15, the acts further comprising:

instructing the generative image model to restyle the composited inpainted image using an image-to-image technique based at least on a restyling prompt.

* * * * *